(12) United States Patent
Hanaoka et al.

(10) Patent No.: US 7,769,911 B2
(45) Date of Patent: Aug. 3, 2010

(54) DATA READING METHOD AND DATA READING APPARATUS

(75) Inventors: Yuji Hanaoka, Kawasaki (JP); Hidenori Matsumoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 134 days.

(21) Appl. No.: 11/457,483

(22) Filed: Jul. 14, 2006

(65) Prior Publication Data

US 2007/0220178 A1    Sep. 20, 2007

(30) Foreign Application Priority Data

Mar. 16, 2006   (JP) .............................. 2006-072738

(51) Int. Cl.
*G06F 3/00* (2006.01)
*G06F 11/00* (2006.01)

(52) U.S. Cl. .................... 710/6; 710/3; 710/5; 714/16; 714/17

(58) Field of Classification Search ............... 710/5, 710/3, 6; 714/16, 17
See application file for complete search history.

(56) References Cited

U.S. PATENT DOCUMENTS

| | | | | |
|---|---|---|---|---|
| 4,901,232 | A * | 2/1990 | Harrington et al. ............. | 710/6 |
| 5,488,706 | A * | 1/1996 | Wendorf et al. ................ | 710/5 |
| 5,530,848 | A * | 6/1996 | Gilbert et al. ................ | 719/313 |
| 5,544,329 | A * | 8/1996 | Engel et al. .................... | 710/6 |
| 6,247,077 | B1 * | 6/2001 | Muller et al. ................. | 710/74 |
| 6,625,683 | B1 * | 9/2003 | Khan et al. .................. | 710/313 |
| 6,633,936 | B1 * | 10/2003 | Keller et al. ................. | 710/107 |
| 6,728,809 | B1 * | 4/2004 | Suzuki et al. ................ | 710/118 |
| 6,766,440 | B1 * | 7/2004 | Steiss et al. .................. | 712/218 |
| 6,834,314 | B1 * | 12/2004 | Askar ........................... | 710/5 |
| 6,938,091 | B2 | 8/2005 | Das Sharma | |
| 2003/0065833 | A1 * | 4/2003 | Brice et al. .................... | 710/50 |
| 2003/0145136 | A1 * | 7/2003 | Tierney et al. ................. | 710/3 |
| 2004/0024945 | A1 * | 2/2004 | Keller et al. ................. | 710/305 |
| 2004/0059839 | A1 * | 3/2004 | Bogin et al. ................... | 710/5 |
| 2005/0240696 | A1 * | 10/2005 | Hasegawa et al. ........... | 710/105 |
| 2005/0273655 | A1 * | 12/2005 | Chow et al. .................. | 714/16 |

(Continued)

FOREIGN PATENT DOCUMENTS

JP            63-316539 A         12/1988

(Continued)

OTHER PUBLICATIONS

"Japanese Office Action", Partial English-language translation, mailed Jun. 16, 2009 from JP Patent Office for corresponding JP App. No. 2006-072738.

(Continued)

*Primary Examiner*—Henry W. H. Tsai
*Assistant Examiner*—Steven G Snyder
(74) *Attorney, Agent, or Firm*—Fujitsu Patent Center

(57) ABSTRACT

A data reading method includes the steps of: a reading request issuing step of issuing a reading request for reading predetermined stored data; and a reading request re-issuing step of re-issuing a reading request when read data responsive to the reading request has not arrived within a predetermined time period, wherein: in the reading request re-issuing step, a flag is attached to the re-reading request, and thus, the re-reading request is differed from the first issued reading request.

10 Claims, 23 Drawing Sheets

U.S. PATENT DOCUMENTS

2006/0277434 A1* 12/2006 Tsern et al. .................. 714/17
2007/0186012 A1* 8/2007 Handlogten et al. ............ 710/6

FOREIGN PATENT DOCUMENTS

| JP | 06-259374 | | 9/1994 |
| JP | 06-337823 | A | 12/1994 |
| JP | 09-252331 | | 9/1997 |
| JP | 2001051943 | A * | 2/2001 |
| JP | 2002-041445 | | 2/2002 |
| JP | 2003-288283 | | 10/2003 |
| JP | 2005-085079 | | 3/2005 |
| WO | WO 2007099586 | A1 * | 9/2007 |

OTHER PUBLICATIONS

Partial English translation, "Corresponding Japanese Office Action", dated Jan. 25, 2010.

* cited by examiner

FIG.6

| FORMAT | TYPE | TC | RSV | TD/EP | ATTRI-BUTE | LENGTH |
|---|---|---|---|---|---|---|

| COMPUTER ID | BYTE COUNT & BCM | STATE |
|---|---|---|

| REQUESTER ID | TAG | R | ROW ADDRESS |
|---|---|---|---|

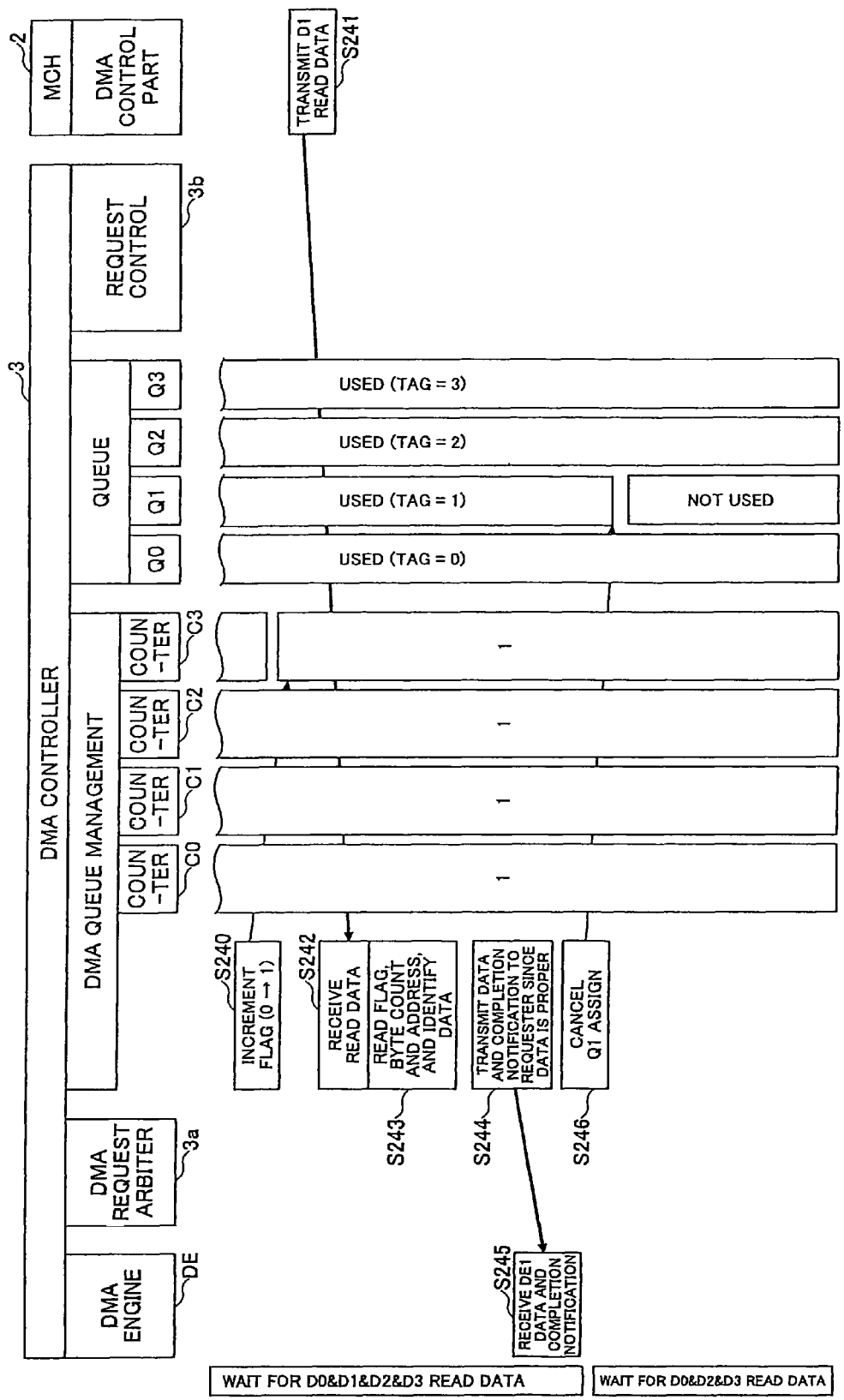

DATA READING METHOD AND DATA READING APPARATUS

BACKGROUND OF THE INVENTION

1. Field of the Invention

The present invention relates to a data reading method and a data reading apparatus, and, in particular, to a data reading method and a data reading apparatus in which desired read data, stored previously, is obtained in response to issuance of a reading request.

2. Description of the Related Art

For example, a system called PCI-Express has been proposed as an interface system used when data stored in a hard disk drive is read.

PCI-Express was proposed by Intel Corporation, and creation of a specification thereof has been carried on by PCI-SIG. PCI-Express corresponds to a serial interface known by a name '3GIO (3rd generation I/O)'.

A PCI bus employed by the most of current computers applies a parallel transfer system. Thereby, no compatibility exists between the current PCI and the above-mentioned PCI-Express on the physical technical level. However, a communication protocol and so forth can be applied in common therebetween.

Further, while a highest communication data rate of the current PCI is 1.06 Gbps, a highest communication data rate of PCI-Express is 2.5 Gbps. Further, since a use in such a manner that a plurality of buses are bound up is allowed, a communication data rate of 5 Gbps can be achieved as a result of two lanes of PCI-Express buses being bound up.

In a protocol of PCI-Express, as will be described later, an order of read data obtained responsive to respective reading requests is not guaranteed. On the other hand, for when data stored in a memory is read, a system may be applied in many cases such that, a time required for obtaining read data from a time of issuance of a corresponding reading request is measured, and, the reading request is issued again when the read data has not been obtained within a predetermined time period, i.e., when time out occurs.

According to the PCI-Express interface, an order of read data responsive to respective reading requests is not guaranteed as mentioned above. Therefore, when a reading request is issued again after time out is detected as mentioned above (referred to as 'retry' hereinafter), it may not be possible to determine whether the resultant read data is one responsive to the first reading request or one responsive to the second reading request (retry) issued after the time out detection.

In such a case, since the retry is made once acquisition of read data responsive to the first reading request is given up, a problem may occur when read data is then obtained responsive to the first reading request unexpectedly after the retry, and it is not possible to positively determine whether the read data thus obtained is one responsive to the first reading request or one responsive to the retry. In such a case, proper data may not be obtained, in view of the entire read data obtained responsive to predetermined successive reading requests.

Japanese Laid-open Patent Applications Nos. 2002-41445 and 2005-85079 disclose related arts.

SUMMARY OF THE INVENTION

The present invention has been devised in consideration of the above-mentioned problem, and, an object of the present invention is to provide a system such that, even an interface such as PCI-Express in which an order of read data responsive to reading requests is not guaranteed, desired read data can be positively identified.

According to the present invention, a flag is attached to a reading request when the reading request is issued again so that, the reading request concerning the re-issuance can be positively distinguished from the reading request initially issued A configuration is made such that the flag thus attached to the reading request is kept after the issuance thereof, and read data obtained responsive to the reading request should have the same flag. Thereby, it is possible to easily and positively determine whether or not the reading data received is one responsive to the latest reading request, by reading the flag which the received read data has.

Since it is possible to easily and positively determine whether or not the read data received is one responsive to the latest reading request by reading the flag which the received read data has as mentioned above, proper data reading can be always ensured even when such an interface system as that an order of read data responsive to respective reading requests is not guaranteed as the above-mentioned PCI-Express system. Thus, reliability in data reading in a data storage system can be positively improved.

BRIEF DESCRIPTION OF THE DRAWINGS

Other objects and further features of the present invention will become more apparent from the following detailed description when read in conjunction with the accompanying drawings:

FIG. 6 illustrates an example of a header format of a data transfer packet in the file control system of FIG. 1;

FIGS. 23 through 27 show a sequence diagram illustrating the flag assigning operation executed by the DMA controller of FIG. 5 when data reading requests are received successively.

DETAILED DESCRIPTION OF THE PREFERRED EMBODIMENT

An embodiment of the present invention is described in detail with reference to figures.

Figure 1:
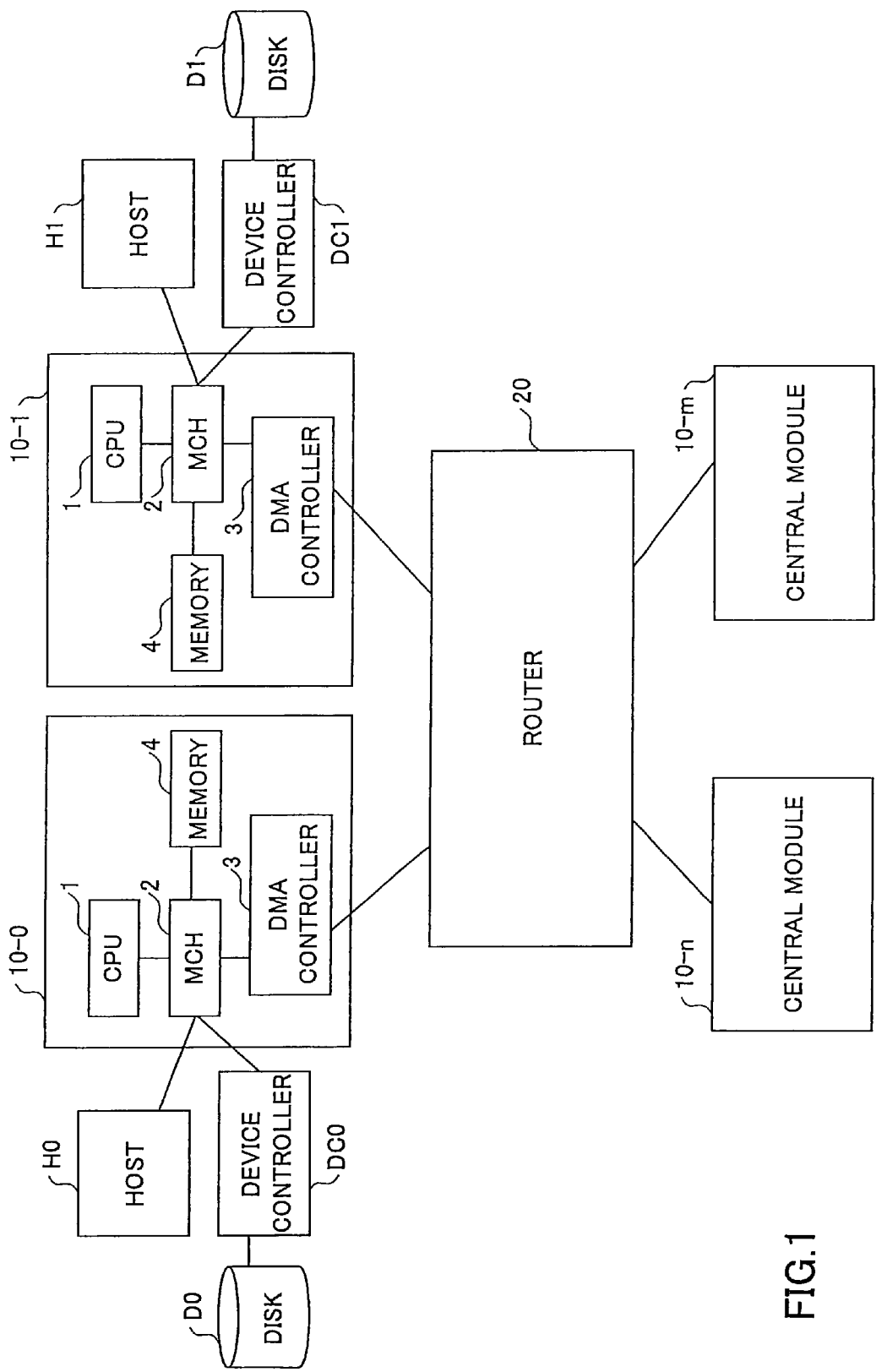
FIG. 1 shows a general configuration of a file control system according to one embodiment of the present invention.

FIG. 1 shows a configuration of a file control system according to the embodiment of the present invention.

In this file control system, a so-called RAIDx configuration such that the above-mentioned PCI-Express interface is employed as inter-device interface is provided.

In FIG. 1, respective central modules 10-0, 10-1, 10-2, ..., 10-n and 10-m are connected mutually by means of a router 20 in such a manner that they can mutually communicate data.

To each central module, a host (H0 for the central module 10-0) and a hard disk drive (D0 for the same) by means of a device controller (DC0 for the same), are connected.

Further, each control module has a CPU 1, a memory controller hub (abbreviated as MCH, hereinafter) 2, a memory 4 and a DMA controller 3.

Figure 2:
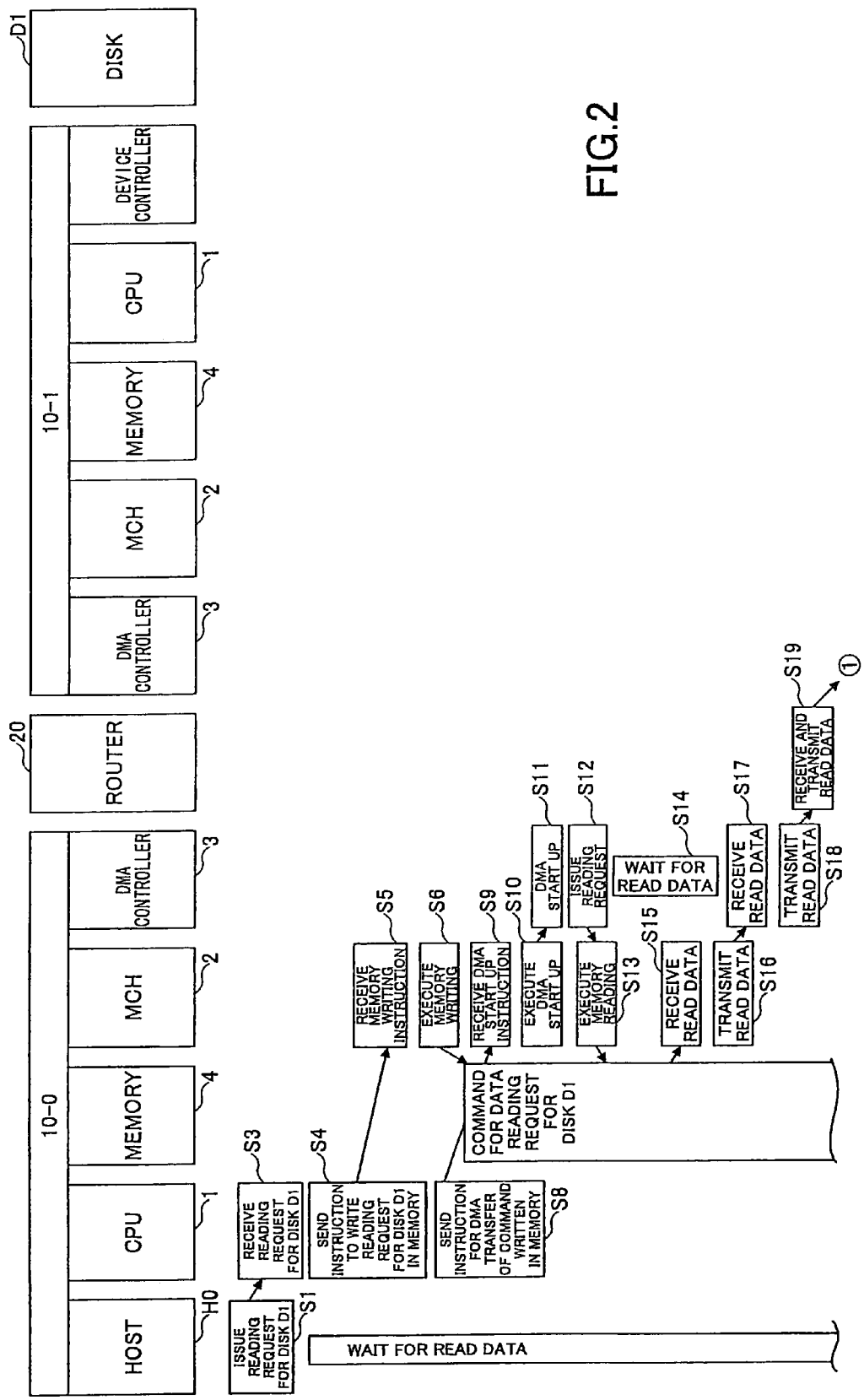
FIGS. 2 through 4 show a sequence diagram illustrating data transfer operation in the file control system shown in FIG. 1.
Figure 3:
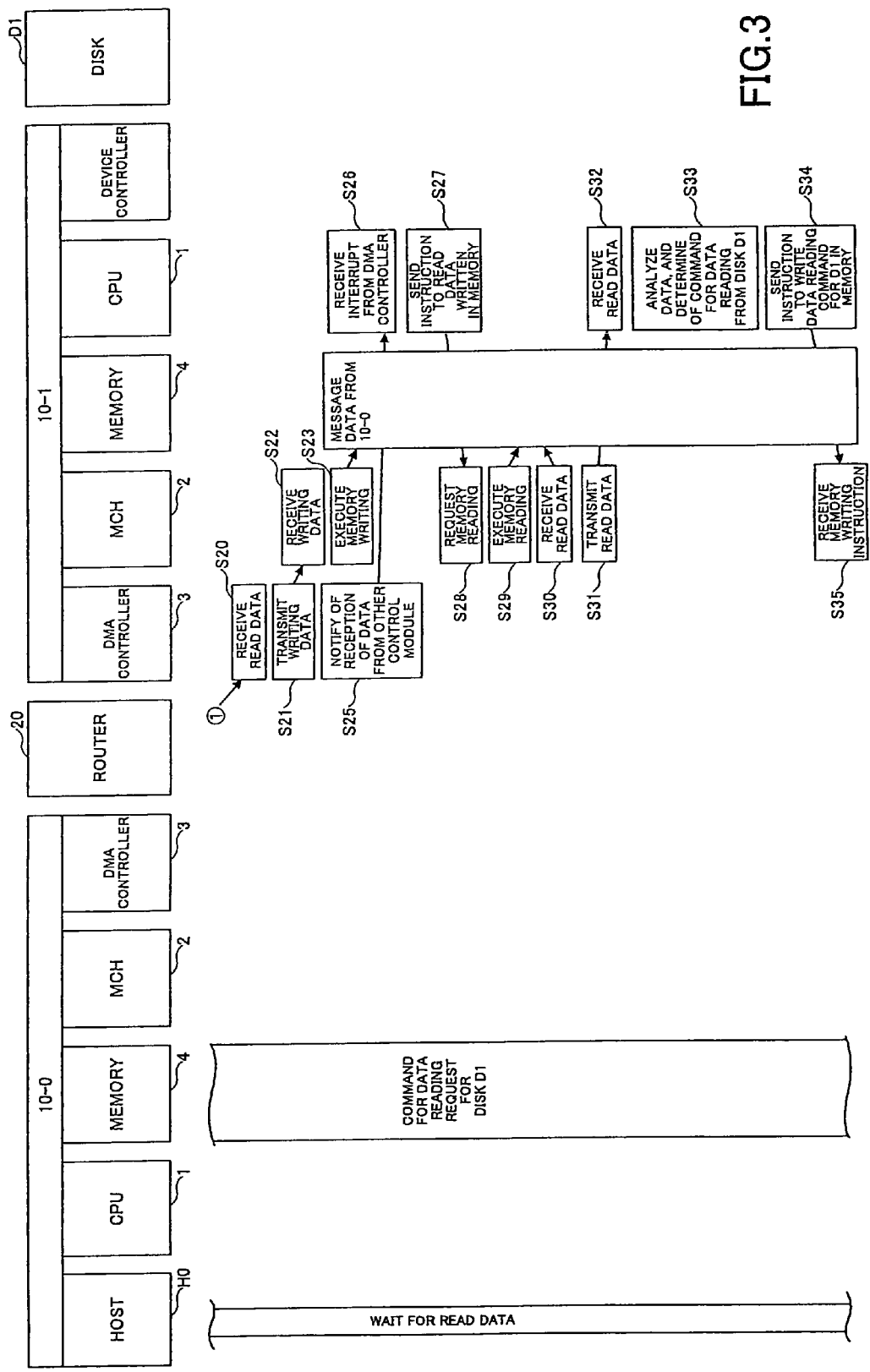
Figure 4:
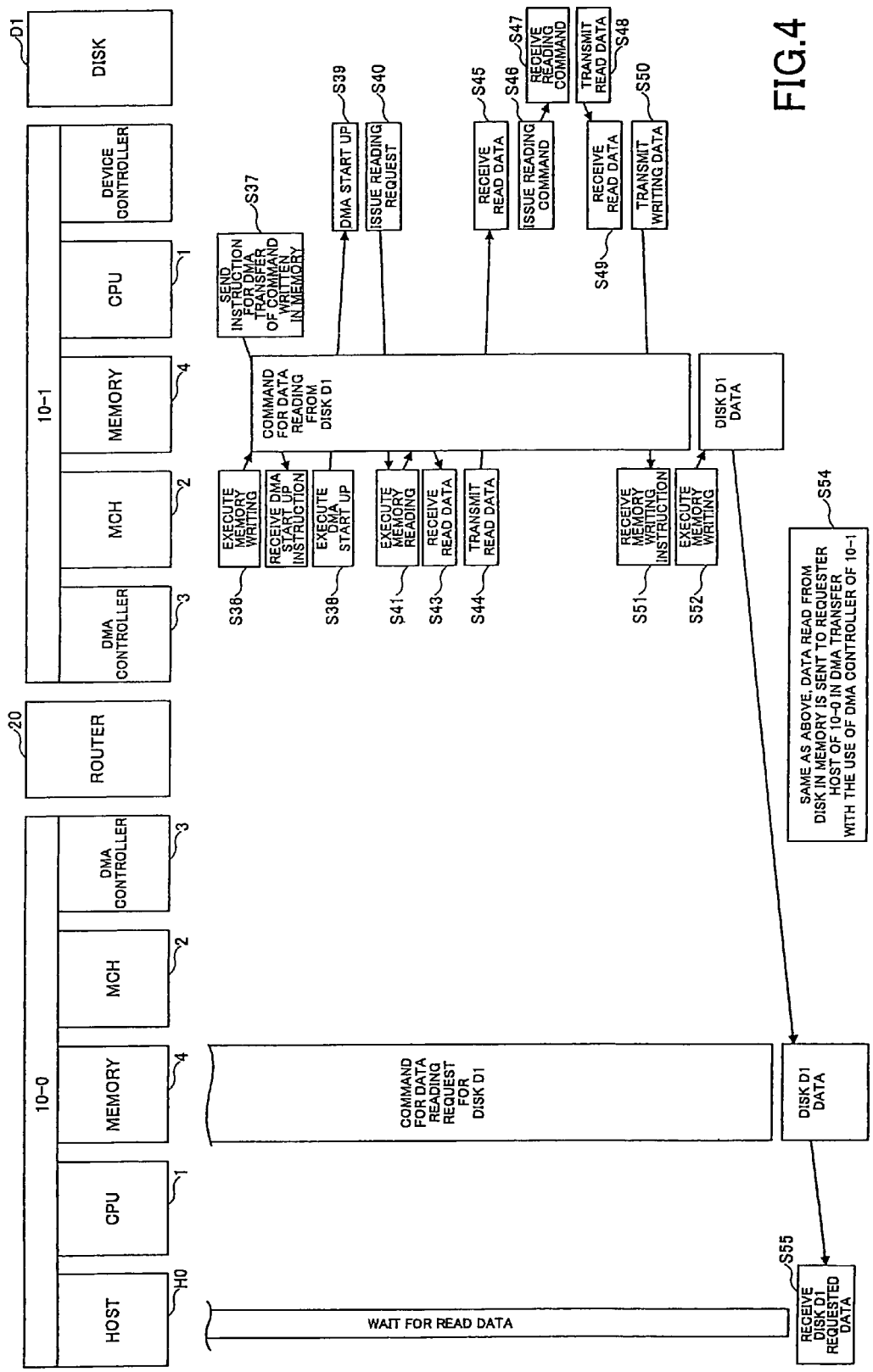

With reference to FIGS. 2-4, a data transfer operation example in the file control system is described next.

In FIG. 2, when a data reading request is issued by the host H0 for reading data from the hard disk drive D1 (step S1), CPU 1 of the central module 10-0 receives it (Step S2), and issues an instruction for writing the data reading request command for the hard disk drive D1 in the memory 4 (Steps S3 and S4). MCH 2 receiving it writes the command in the memory 4 accordingly (Steps S5 and S6).

The above-mentioned CPU 1 sends an instruction to MCH 2 for a DMA transfer of the command written in the memory 4 (Step S8). MCH 2 receiving it sends an instruction to the DMA controller 3 for starting up DMA operation (Step S9, S10).

The DMA controller 3 receiving it starts up DMA operation accordingly, and issues a reading request (Steps S11, S12). MCH 2 receiving it reads out the above-mentioned data reading request command for the hard disk drive D1, and returns the same to the DMA controller 3 (Steps S13, S15, S16).

The DMA controller 3 receiving it transmits the reading request to the DMA controller 3 of the central module 10-1, corresponding to the target hard disk drive D1, via the router 20 (Steps S17, S18, S19).

Then, in FIG. 3, the DMA controller 3 of the central module 10-1 receiving it writes the received reading request in the memory via MCH 2 included in the central module 10-1 (Steps S20, S21, S22, S23).

The DMA controller 3 of the central module 10-1 notifies CPU 1 included in the central module 10-1 that the data is thus received from the other central module (Step S25). CPU 1 reading it sends an instruction to MCH 2 for reading the data written in the memory 4 (Steps S26, S27).

MCH 2 of the central module 10-1 receiving it reads the data from the memory 4 and returns it to CPU 1 (Steps S28, S29, S30, S31). It is noted that, the data thus read out from the memory 4 and returned to CPU 1 means the above-mentioned reading request for the hard disk drive D1, which was originally issued by the host H0, the central module 10-0 corresponding to the host H0 handled it, and then, the same was transferred in the operation described above with reference to FIG. 2.

CPU 1 of the central module 10-1 receiving the data analyses it, and thus recognizes that the data is the reading request for reading data from the hard disk drive D1 (Steps S32, S33). Then, CPU 1 sends an instruction to MCH 2 for writing this data reading request command for the hard disk drive D1 in the memory 4, according to the recognition (Steps S34, S36). MCH 2 receiving it writes the command in the memory 4.

Then, in FIG. 4, CPU 1 sends an instruction to MCH 2 for a DMA transfer of the command thus written in the memory 4 (Step S37). MCH 2 receiving it starts up DMA operation of the device controller DC1 (Steps S38, S39).

The device controller DC1 starting up DMA operation issues a reading request. MCH 2 receiving it then reads the above-mentioned command from the memory 4, and returns it to the device controller DC1 (Steps S40, S41, S43, S44). The command thus returned is the above-mentioned data reading request command for reading data from the hard disk drive D1. The device controller DC1 receiving it issues a reading request to the hard disk drive D1, and thus reads data from the hard disk drive D1 (Steps S45, S46, S47, S48, S49).

The device controller DC1 receives the thus-read data, and writes the same in the memory 4 via MCH 2 (Steps S50, S51, S52).

After that, in the same operation as that described above, i.e., the operation for transferring the reading request data, written in the memory 4 of the central module 10-0, to the request target hard disk drive D1 from the host H0, the read data written in the memory 4 of the central module 10-1 is then sent back to the host H0 of the central module 10-0 which is the requester, in the DMA transfer manner by the function of the DMA controller 3 and so forth of the central module 10-1 (Steps S54, S55).

Figure 5:
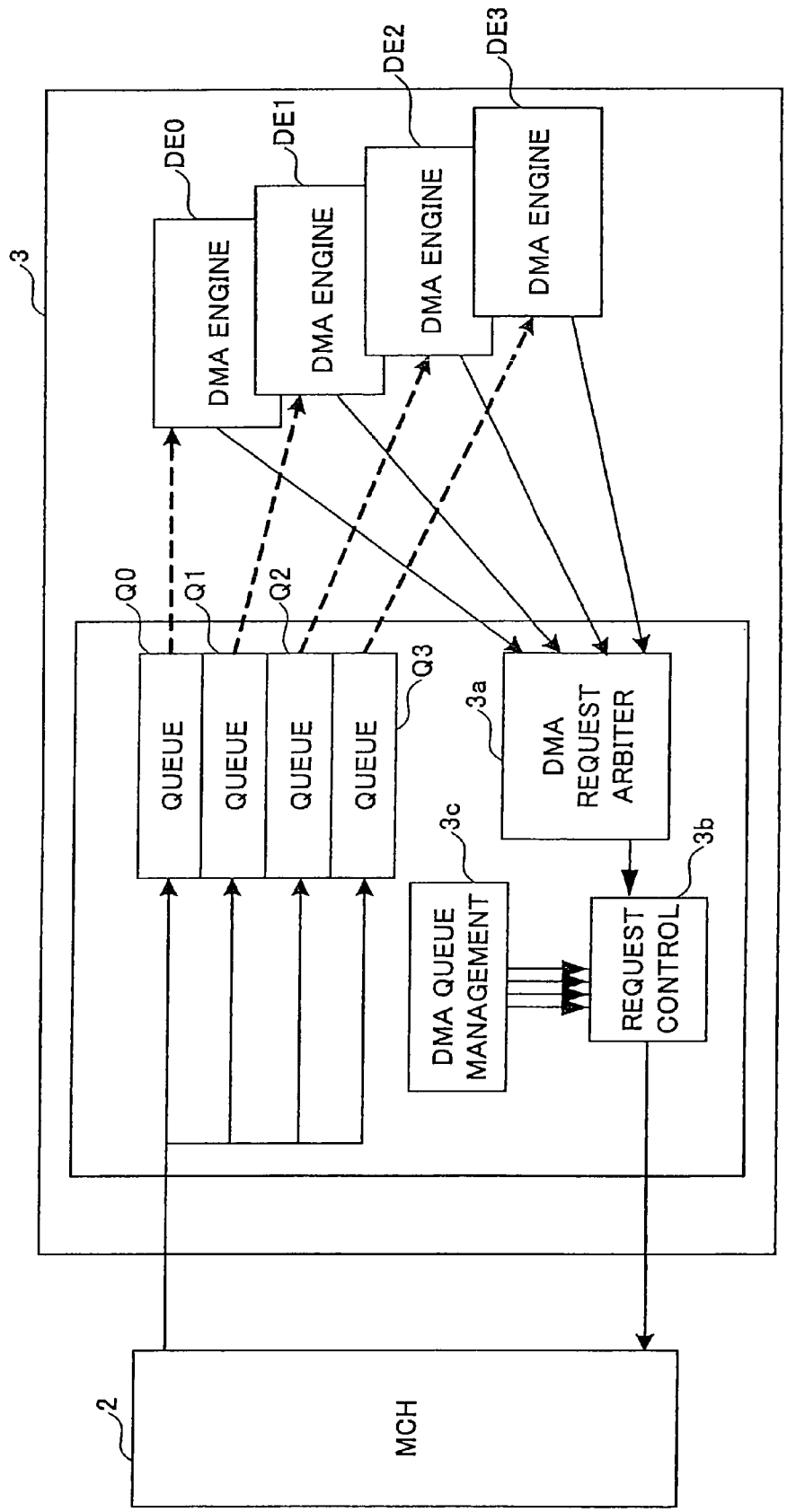
FIG. 5 shows a block diagram illustrating a function of a DMA controller included in each central module included in the file control system shown in FIG. 1.

FIG. 5 shows one example illustrating functions and operations of DMA engines DE0 through DE3 and queuing buffers (simply referred to as 'queues', hereinafter) Q0 through Q3 included in the DMA controller 3 of the central module 10-0.

As shown, the DMA controller 3 has the plurality of (in this example, four) DMA engines and the plurality of (the same four) queues, and thus, the DMA controller 3 is allowed to issue a plurality of data reassign requests successively.

As mentioned above, the DMA controller 3 issues the memory reading request to MCH 2 (Step S12 of FIG. 2 for example). As a result, the data reading request for the hard disk drive D1, originally issued by the host H0, the requester, is read out from the memory 4 (Steps S13, S15, S16, S17). This request is then sent in the DMA transfer manner by means of the DMA controller 3 of the requesting central module 10-0, and is interpreted by CPU 1 of the requested central module 10-1 (Step S33 of FIG. 3). As a result, the desired data is read out from the requested hard disk drive D1, is then sent back in the DMA transfer manner by means of the functions of the DMA controller 3 of the requested central module 10-1 and the DMA controller 3 of the requesting central module 10-0, and as a result, the read data is transferred to or returned to the requesting host H0 (Step S54).

In the above-described process, the above-mentioned Steps S12, S13, S15, S16 and S17 will be discussed now, for example.

In this process, the read data, read out from the memory 4 and transferred to the DMA controller 3 responsive to the reading request made by the DMA controller 3, has a form of a packet, and called a completion packet.

As mentioned above, according to the PCI-Express protocol, completion packets responsive to respective reading requests are returned without guarantee of an order thereof. The requesting DMA controller 3 makes time out monitoring for a completion packet which has not been returned yet. This is for the purpose of efficiently using the DMA resources.

As shown in FIG. 5, the DMA controller 3 has the plurality of DMA engines and queues. Thereby, as mentioned above, it can issue a plurality of reading requests successively. When thus issuing the plurality of reading requests, it will become necessary to determine which one of the plurality of the issued reading requests corresponds to a completion packet to receive, since a returning order is not guaranteed as mentioned above.

FIG. 6 shows one example of a header format of the completion packet. The above-mentioned identification of the completion packet is carried out by the following manner, for example:

That is, when a reading request is issued by the DMA engine shown in FIG. 5, arbitration is made by a DMA request arbiter 3a, and then, a queue is assigned for the reading request. Then, in the assigned queue, a request control part 3b writes information such as an address in the memory 4 for the reading request, a byte count indicating a data length to read out, and so forth. Further, in the queue, a requester ID for identifying a requester device and a tag as an identification number of the DMA engine which has thus issued the reading request are written.

A reading request is then generated by the request control part 3b to include the above-mentioned information, thus written in the queue, i.e., the address, byte count, requester ID and tag, and is issued to MCH 2 (Step S12 of FIG. 2).

MCH 2 receiving this reading request reads data from the memory 2 according to the reading request, and returns the read data to the DMA controller 3 (Steps S13, S15, S16). The returned data is the above-mentioned completion packet. The header of the completion packet has the format such as that shown in FIG. 6, for example.

A queue management part 3c of the DMA controller 3 receiving it reads the requester ID, tag, address (on this occasion, 'row address'), byte count and so forth, written in corresponding fields of the header of the completion packet, and compares them with the corresponding information which was written in the queue as mentioned above when the corresponding reading request was issued. Thus, identification is determined. This identification determination means a determination as to whether or not the completion packet is one obtained from the corresponding reading request.

On the other hand, as mentioned above, the queue management part 3c carries out time out monitoring for the completion packet. Then, when the completion packet has not been obtained within a predetermined time period from the issuance of the corresponding reading request, the queue management part 3c issues the reading request again. In this case, a problem may occur when the completion packet responsive to the first reading request is obtained after the time out, other than the completion packet responsive to the re-issued reading request.

That is, when both the completion packets responsive to the first reading request and responsive to the re-issued reading request are obtained, the queue management part 3c may not properly recognize the situation. The reason therefor is described now. Generally speaking, the address compared in the above-mentioned identification determination may be simplified in such a manner that, from an original one of 64 bits or 32 bits, only the least 7 bits are extracted partially (the resultant address being referred to as a 'row address').

As a result, when reading requests are issued successively while the address is updated each time in sequence, the least 7 bits thereof may coincident thereamong by accident. Further, the other information to compare, i.e., the byte count, requester ID and tag are common when the data should be read from the memory 2 in common.

In such a case, even when the completion packets having the completely identical addresses, i.e., having the completely identical contents, the queue management part 3c cannot determine whether these completion packets have the completely identical data, or they are different but merely the least 7 bits thereof are identical by accident. Therefore, the queue management part 3c cannot recognize that the identical data has been actually obtained, but may rather erroneously determine that proper data has been obtained, and proceed with subsequent processing thereafter in a regular manner. As a result, actually, proper data reading cannot be ensured.

By employing the configuration of the DMA controller 3 according to the embodiment of the present invention, when a reading request is issued to MCH 2, the queue management part 3c embeds a flag in a not-yet-used area of the packet of the reading request. This flag is also included in the completion packet responsive to the reading request. As a result, when the above-mentioned identification determination is carried out for the completion packet, the above-mentioned flag included in the completion packet is read together when the tag, row address and byte count are read as mentioned above. As a result, it is possible to positively determine whether or not the completion packet obtained is one responsive to the re-issued reading request.

This operation is described now with reference to FIGS. 7 through 10.

Figure 7:
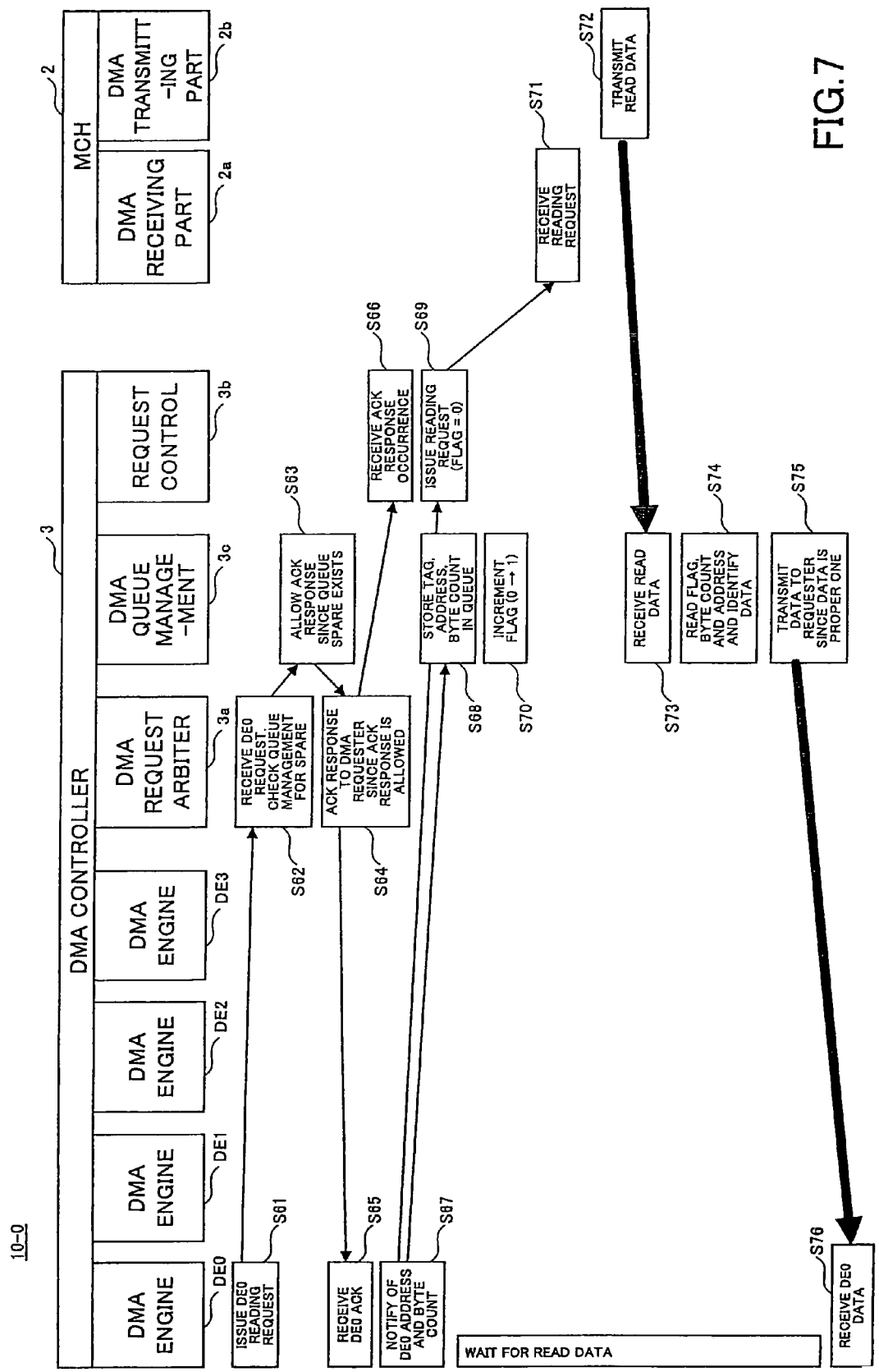
FIG. 7 shows a sequence diagram illustrating DMA transfer operation (regular occasion) executed by the DMA controller shown in FIG. 5.

FIG. 7 shows an operation flow for regular data transfer, i.e., one for when no time out occurs.

As one example, it is assumed that a reading request is issued by the DMA engine DE0 in Step S61. This is sent to the DMA request arbiter 3a, which inquires the queue management part 3c for a spare of the queue (Step S62). When a spare queue exists, the queue management part 3c returns this fact (Step S63). The DMA request arbiter 3a receiving it returns this fact to the requester, i.e., the DMA engine DE0 (Step S64). Further, this return is notified of to the request control part 3b (Step S66).

The DMA engine DE0 receiving this return notifies the queue management part 3c and the request control part 3b of the address and byte count concerning the reading request (Step S67). The queue management part 3c receiving it stores, in the queue, the information concerning the reading request thus notified of, and further, the tag of the requester, the DMA engine DE0, i.e., the number '0 '(Step S68).

Further, the request control part 3b issues a corresponding reading request to MCH 2 (Step S69). In this case, it embeds the number of the flag counter corresponding to the queue, in the reading request as a flag. After that, the queue management part 3c increments, by one, the flag counter of the queue (Step S70).

The DMA receiving part 2a of MCH 2 which receives the reading request from the request control part 3b of the DMA controller 3 issues a corresponding reading request to the memory 4 (Step S71). The DMA receiving part 2a then returns the data, read out from the memory 4 in response to the reading request, to the requester, the queue management part 3c of the DMA controller 3 as a completion packet (Step S72).

In this case, it is assumed that the time period required from the notification of the address and byte count of the reading request from the DMA engine DE0 (Step S68) to the return of the corresponding completion packet to MCH 2 (Step S73) is within the predetermined time out time period. As a result, no re-issuance of the reading request occurs.

The queue management part 3c receiving the completion packet reads the flag, byte count, and row address embedded there, and makes identification determination (Steps S73, S74). That is, it compares them with the row address and byte count stored in the queue and the flag counter value of the queue when the reading request was issued in Step S68. Thus, it is determined whether or not the completion packet obtained is one responsive to the corresponding reading request.

When the identification is verified from the determination, the completion packet is then returned to the requester, the DMA engine DE0 (Step S76).

Figure 8:
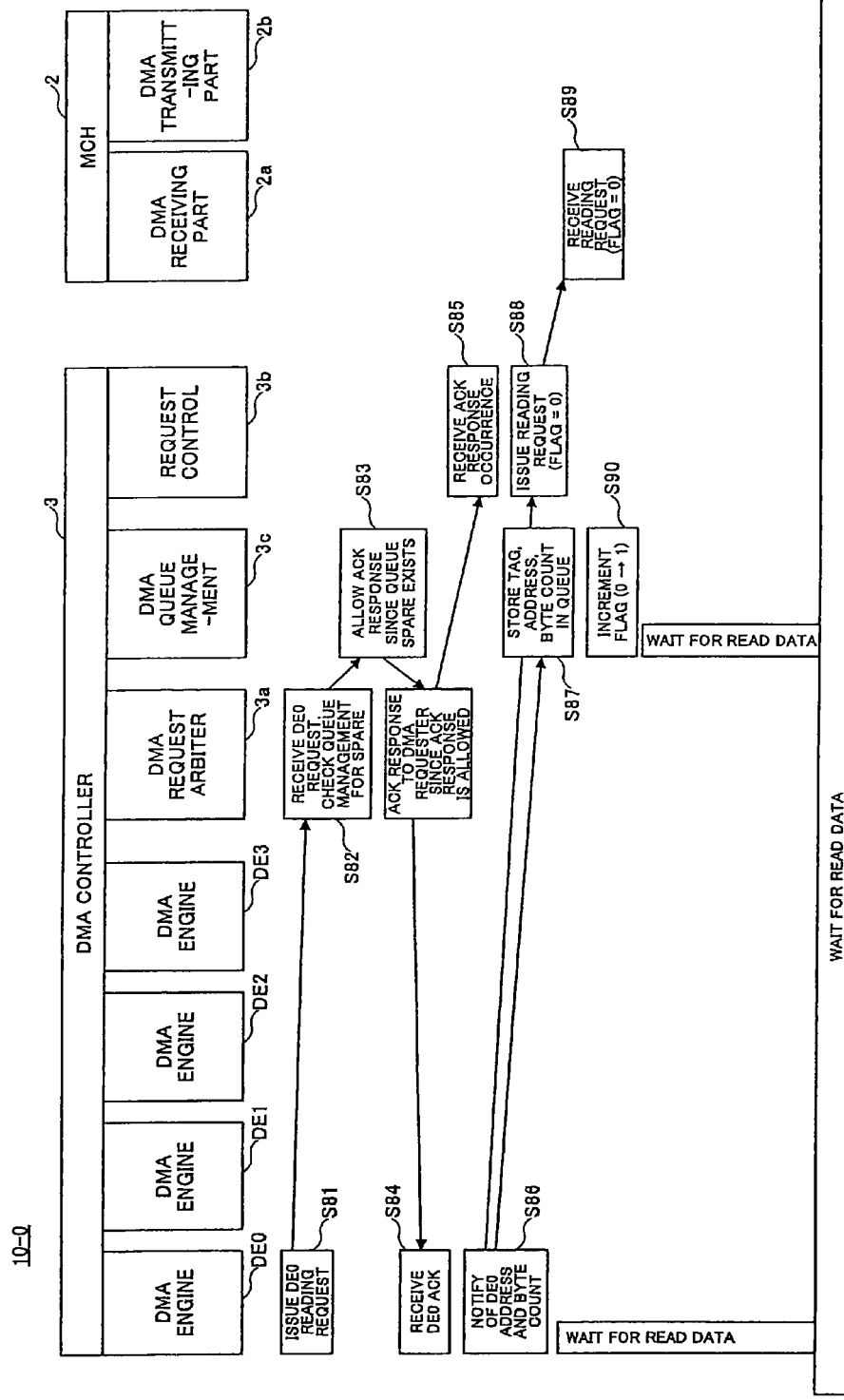
FIGS. 8 through 10 show a sequence diagram illustrating DMA transfer operation (time out occasion) executed by the DMA controller shown in FIG. 5.
Figure 9:
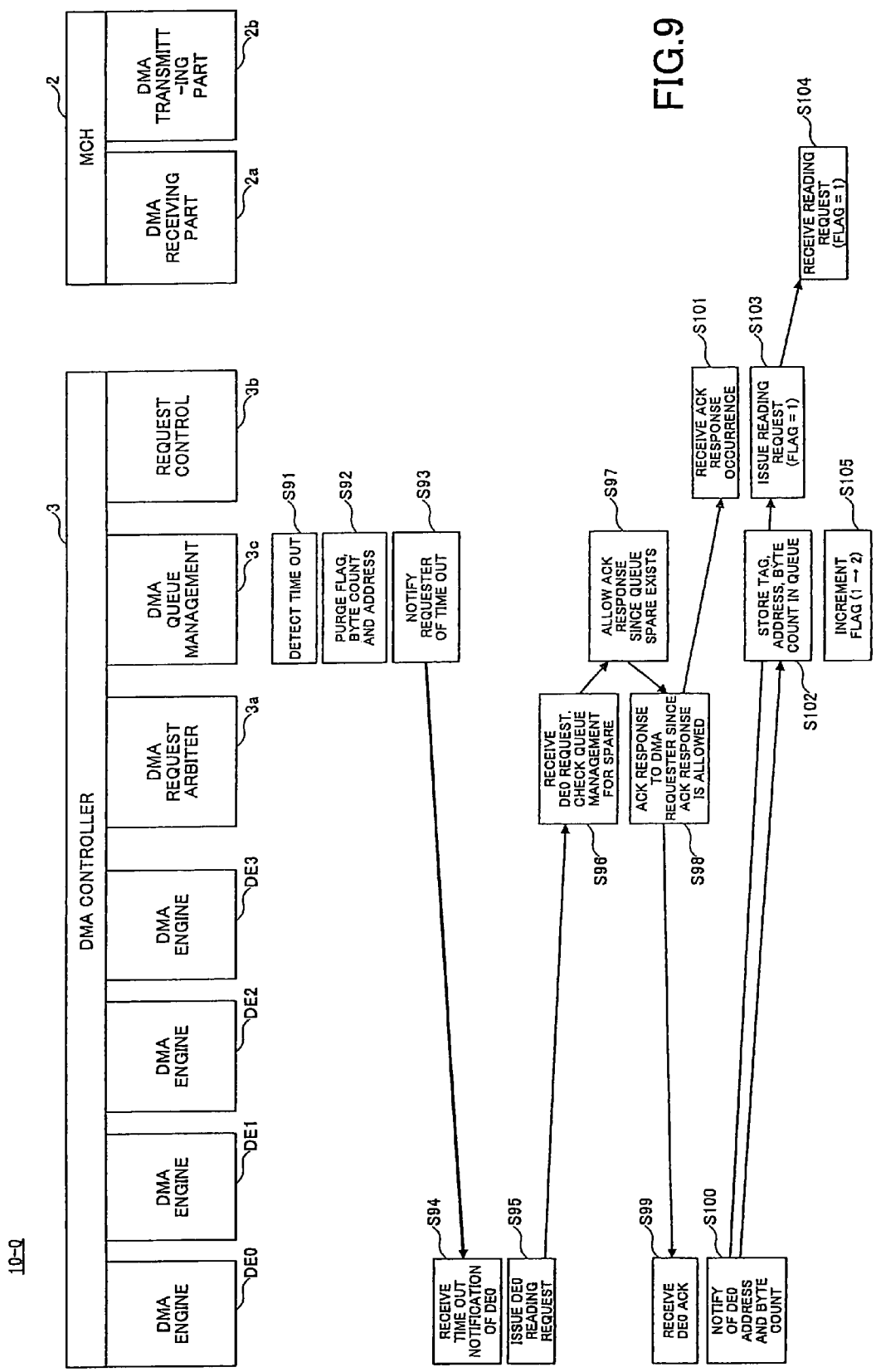
Figure 10:
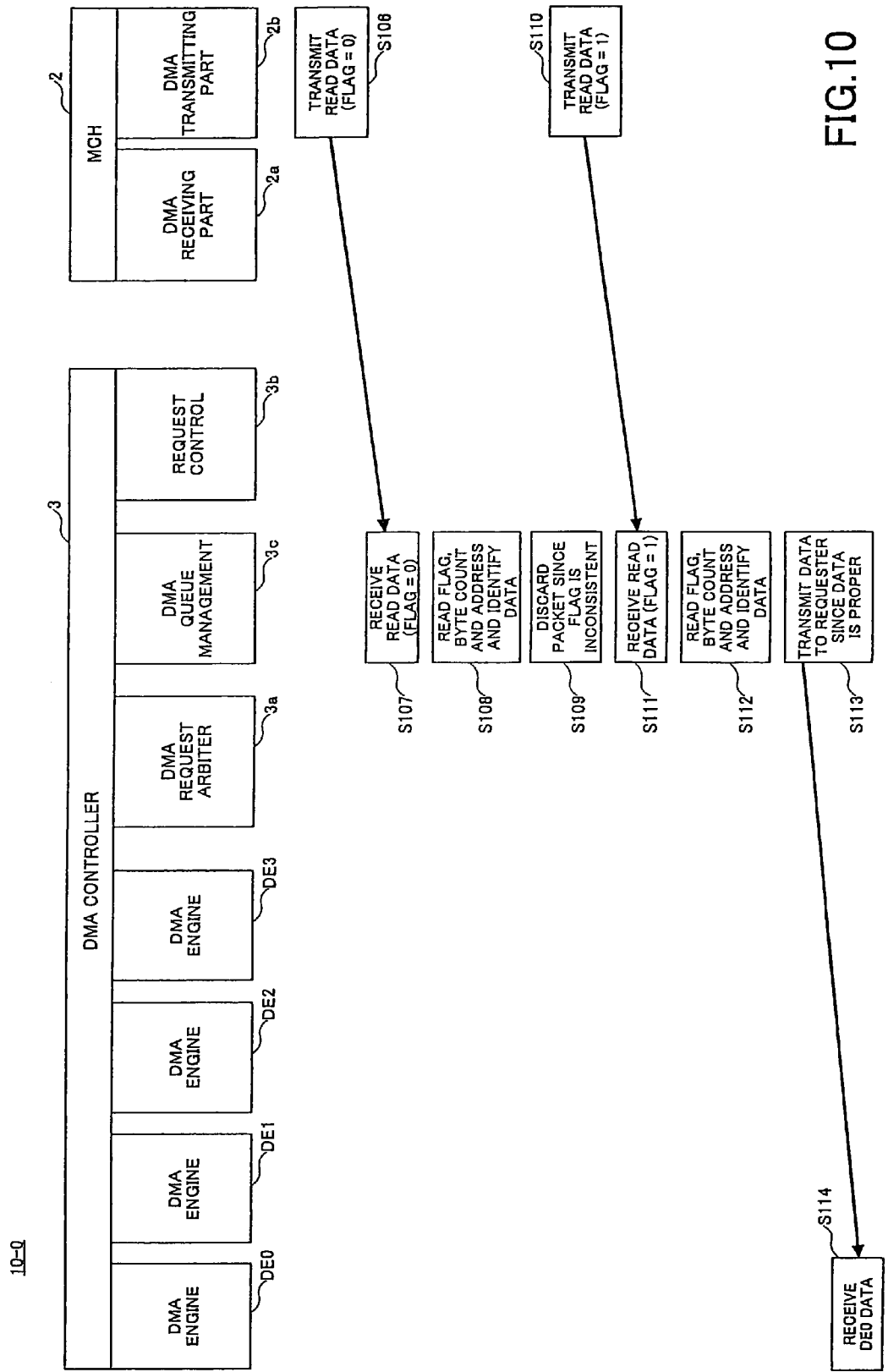

With reference to FIGS. 8 through 10, operation flow for a case where a return of the completion packet responsive to the initially issued reading request has not been obtained within the predetermined time out time period, and re-issuance of the reading request is thus made.

In this case, in Step S81 of FIG. 8, a reading request is first issued by the DMA engine DE0 in Step S81. This is sent to the DMA request arbiter 3a, which inquires the queue management part 3c for a spare of the queue (Step S82). When a spare queue exists, the queue management part 3c returns this fact (Step S83). The DMA request arbiter 3a receiving it returns this fact to the requester, i.e., the DMA engine DE0 (Step S84). Further, this return is notified of to the request control part 3b (Step S85).

The DMA engine DE0 receiving this return notifies the queue management part 3c and the request control part 3b of the address and byte count concerning the reading request (Step S86). The queue management part 3c receiving it stores, in the queue, the information concerning the reading request thus notified of, and further, the tag of the requester, the DMA engine DE0, i.e., the number '0' (Step S87). Further, the request control part 3b issues, to MCH 2, a corresponding reading request (Step S88). In this case, the number of the flag counter of the queue is embedded in the reading request as the flag. The value of the flag is also stored in the queue.

In this case, the flag counter has not yet been incremented yet, and is left as '0'. Accordingly, the flag, '0' is embedded. After that, the queue management part 3c increments the queue's flag counter by one (Step S90). The reading request issued by the request control part 3b of the DMA controller 3 is received by the DMA receiving part 2a of MCH 2 (Step S89).

In this case, as mentioned above, a return of the completion packet responsive to the reading request has not arrived within the predetermined time out time period (Step S91). As a result, the requester, the queue management part 3c of the DMA controller 3 once discards the respective ones of the information of the values of the flag, byte count and address concerning the initial reading request stored in the queue (Step S93). Then, the queue management part 3c notifies the requester, the DMA engine DE0, of the occurrence of time out responsive to the initial reading request (Step S94).

The DMA engine DE0 receiving it again issues the reading request (Step S95). This is then sent to the DMA request arbiter 3a, which then inquires the queue management part 3c for a spare of the queue (Step S96). When a spare queue exists, the queue management part 3c returns this fact (Step S97). The DMA request arbiter 3a receiving it returns this fact to the requester, i.e., the DMA engine DE0 (Step S98). Further, this return is notified of to the request control part 3b (Step S99).

The DMA engine DE0 receiving this return notifies the queue management part 3c and the request control part 3b of the address and byte count concerning the reading request (Step S99). The queue management part 3c receiving it stores, in the queue, the information concerning the reading request thus notified of, and further, the tag of the requester, the DMA engine DE0, i.e., the number '0 '(Step S102). Further, the request control part 3b issues, to MCH 2, a corresponding reading request (Step S103). In this case, the number of the flag counter of the queue is embedded in the reading request as the flag. The value of the flag is also stored in the queue.

It is noted that the queue's flag counter has already been incremented by one from 0 to 1 in Step S90 when the initial reading request was issued. As a result, the flag embedded in this case is '1' on this occasion. This flag value is stored in the queue as mentioned above. After that, the queue management part 3c increments the queue's flag counter by one (Step S105).

Here, a case is assumed, for example, in which the completion packet read from the memory 4 responsive to the initial reading request thus having the flag '0' embedded therein, i.e., the completion packet having the same flag '0' embedded therein is at this time returned to the DMA controller, the requester, from MCH 2 (Step S106).

In this case, the queue management part 3c receiving this completion packet (Step S107) reads the flag, byte count and address embedded therein, and therewith makes identification determination (Step S108). That is, by comparing them with the row address, byte count and flag counter value stored in the queue in Step S102, determination is made as to whether or not the completion packet currently obtained is one responsive to the corresponding reading request.

In this case, as mentioned above, the information concerning the reading request initially issued and once stored in the queue such as the flag and so forth was discarded (Step S92). As a result, in the queue, the information such as the flag after the updating due to the above-mentioned re-issuance is stored actually (Step S102). As a result, the completion packet currently obtained which has the flag number '0' as mentioned above responsive to the initial reading request is different from the current updated flag number, and the identification determination results in 'disagreement' accordingly. As a result, the completion packet currently obtained is determined as improper, and thus, is then discarded (Step S109).

Next, it is assumed that, after that, the completion packet of the data read out from the memory 4 responsive to the re-issued reading request, i.e., the reading request having the flag '1' embedded therein, which completion packet thus also has the flag '1' accordingly, is returned to the requester, the DMA controller 3, from MCH 2 (Step S106).

In this case, the queue management part 3c receiving the completion packet (S111) reads the flag, byte count and address embedded therein, and makes identification determination (Step S112). That is, by comparing them with the row address, byte count and flag counter value stored in the queue in Step S102, determination is made as to whether or not the completion packet currently obtained is one responsive to the corresponding reading request.

In this case, the flag values of both agree with one another, and thus, the identification is verified, and the queue management part 3c returns the completion packet to the requester, the DMA engine DE0, as the proper data (Step S114).

Thus, in the embodiment of the present invention, when the reading request is again issued after the time out detection, the flag, incremented after the reading request was initially issued, is embedded. Further, the completion packet has the flag embedded therein which is the same as that originally embedded in the corresponding reading request. Accordingly, it is possible to easily and positively determine whether or not the completion packet is one responsive to the initial reading request or one responsive to the re-issued reading request.

A method of assigning the flag according to the embodiment of the present invention will now be described.

Figure 11:
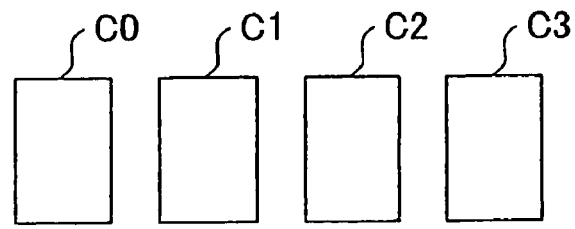
FIGS. 11 through 15 show flag assigning operation executed by the DMA controller of FIG. 5.

As shown in FIG. 11, the flag counters C0 through C3 are provided for the corresponding queues Q0 through Q3 shown in FIG. 5 respectively, and the count values thereof are incremented in such a manner as linking from the corresponding queues' operation.

In the configuration of FIG. 5, when a reading request is issued by the DMA engine, the DMA arbiter 3a makes arbitration, and a reading request which has been selected by the arbitration is transferred to the request control part 3b.

Figure 12:
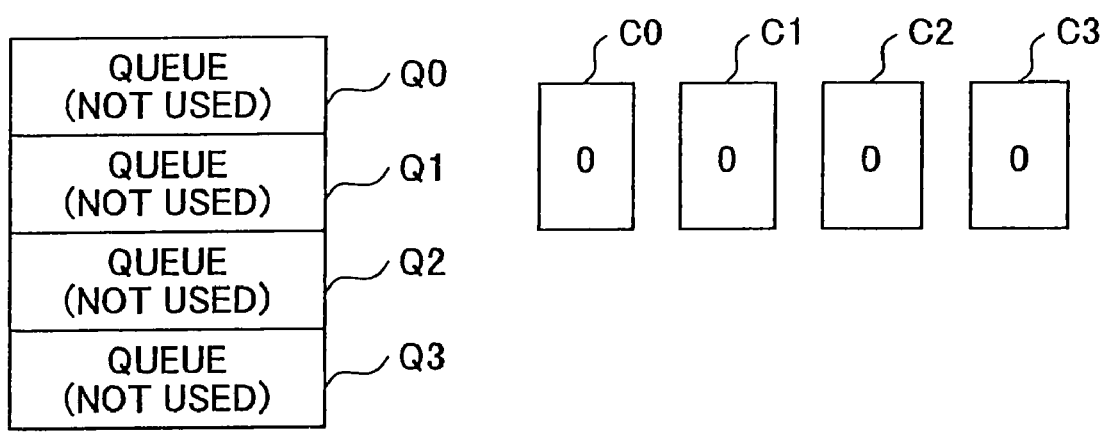
Figure 13:
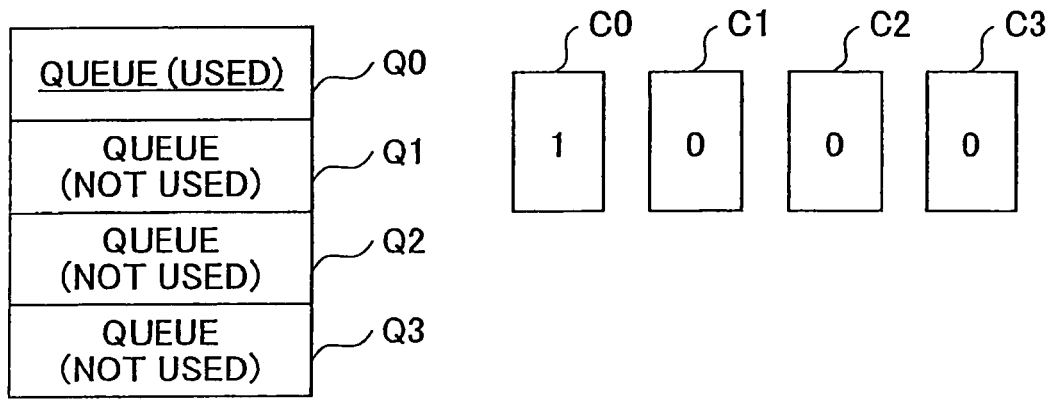

The request control part 3b receives it, checks the current used states of the queues, and assigns a spare queue therefor. In the example of FIG. 12, all the queues are not used, i.e., are spare. In this case, 'queue not used occasion' operation, described later, is carried out.

Further, when reading requests are received by the request control part successively in this state, 'successive request receiving occasion' operation, also described later, is carried out. FIG. 12 shows a state of the above-mentioned queues and flag counters in an initial state before any reading request has come.

The above-mentioned 'queue not used occasion' operation is described first with reference to FIGS. 13 through 18.

Figure 16:
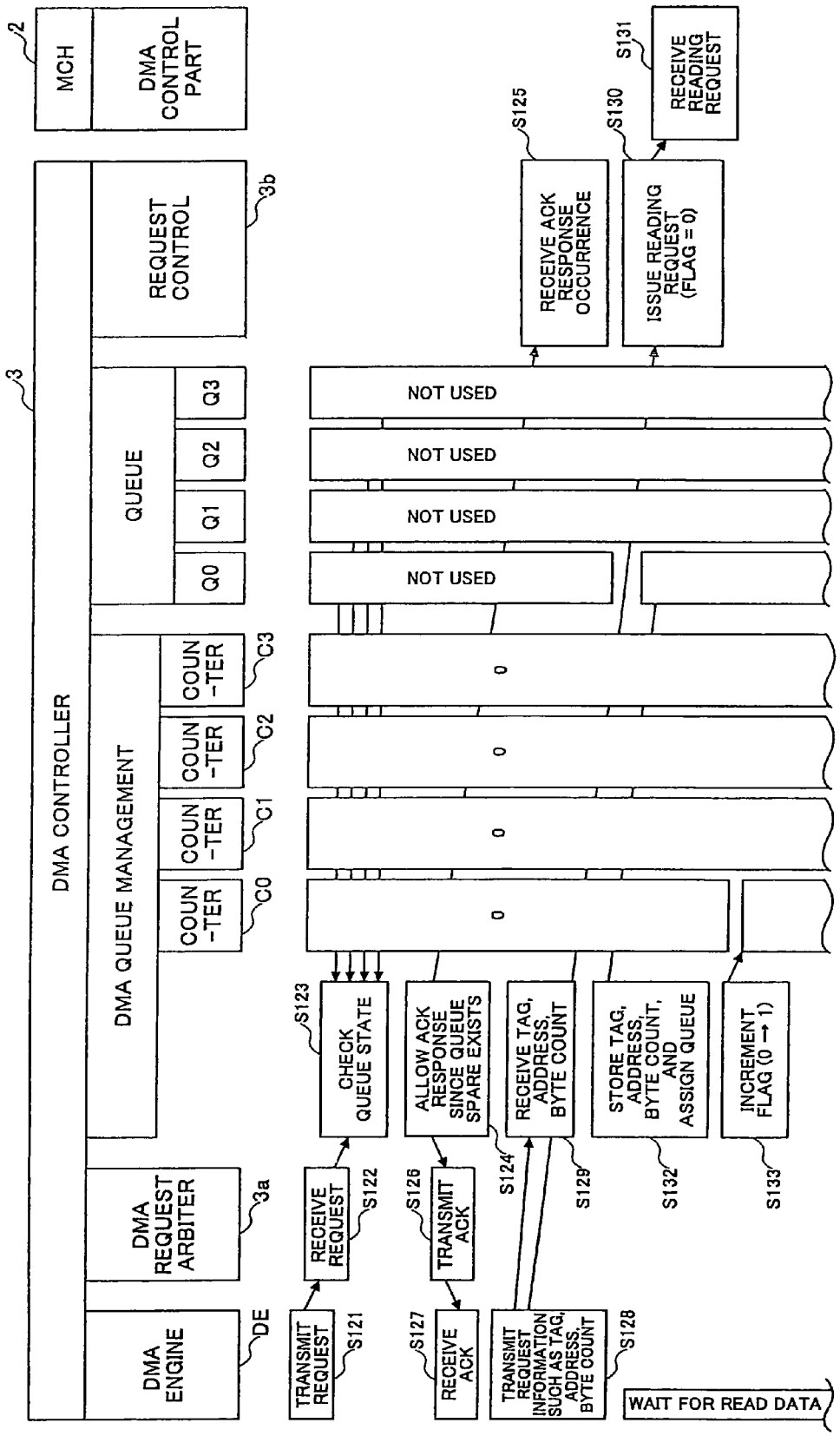
FIGS. 16 through 18 show a sequence diagram illustrating the flag assigning operation executed by the DMA controller of FIG. 5.

In FIG. 16, a reading request is issued by the DMA engine (Step S121), and it is received by the request control part 3b via the DMA request arbiter 3a (Step S122). Then, spare states of the queues is checked (Step S123). Since all the queues are spare in this case as mentioned above, the queue Q0 having the smallest number is assigned (Step S129 of FIG. 13).

The queue spare state exits as mentioned above, and this state is notified of to the DMA request arbiter 3a and the request control part 3b (Steps S124, S125, S126 and S127). The requester, the DMA engine, receiving it, transmits each information concerning the reading request, i.e., the tag, address and byte count (Step S128).

The queue management part 3c receiving it stores, in the assigned queue Q0, the information thus received and the value of the corresponding flag counter C0 as mentioned above (Step 132). Further, the queue management part 3c increments the flag counter C0 corresponding to the queue Q0 by one after the issuance of the reading request (Step S133 of FIG. 13).

Further, the request control part 3b generates a reading request in which the information concerning the reading request received from the DMA engine and the value '0' of the flag counter C0 before the incrementing are embedded, and issues the same to MCH 2 (Step S130). The same is received by MCH 2 (Step S131).

Figure 17:
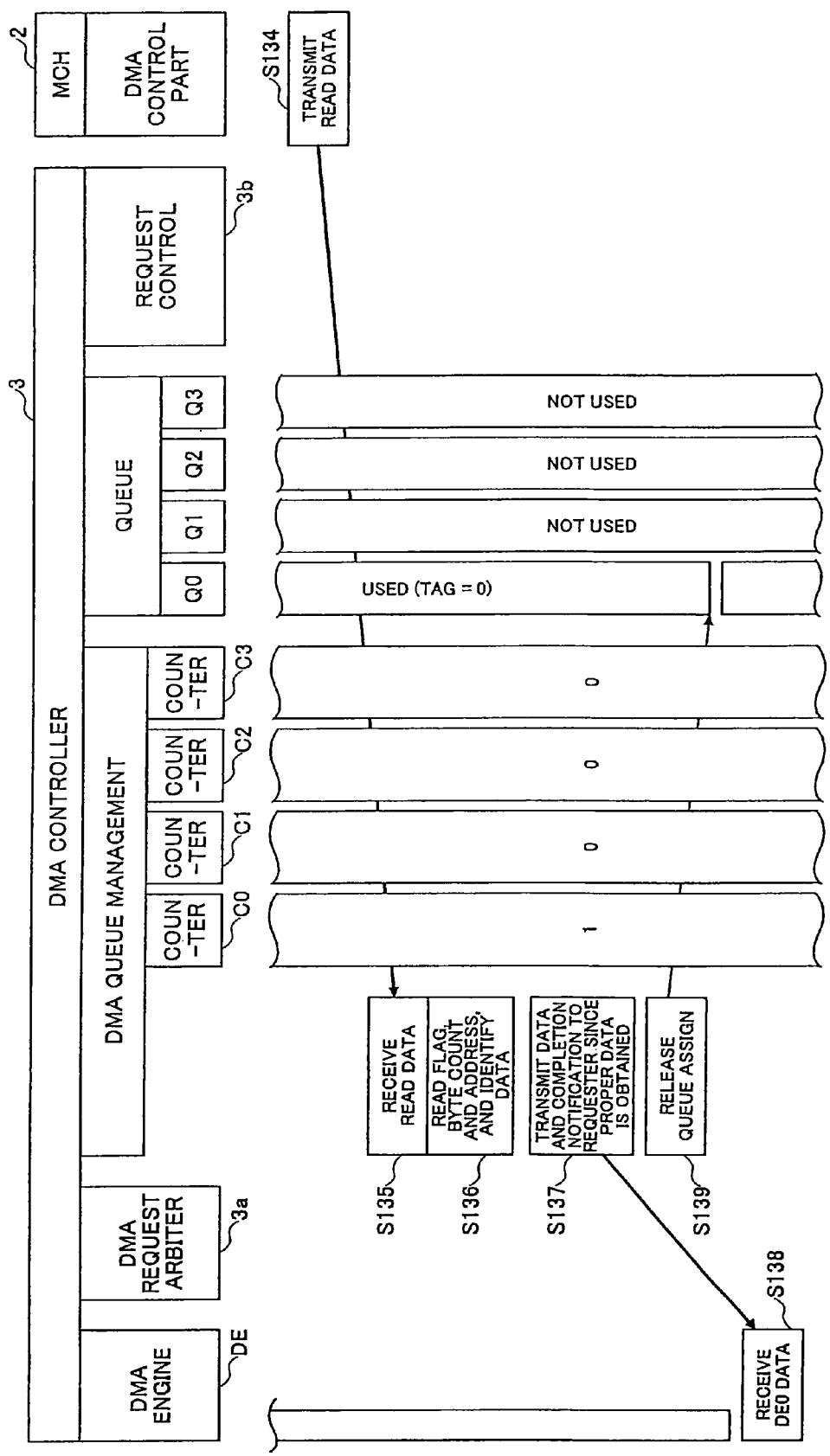
Figure 18:
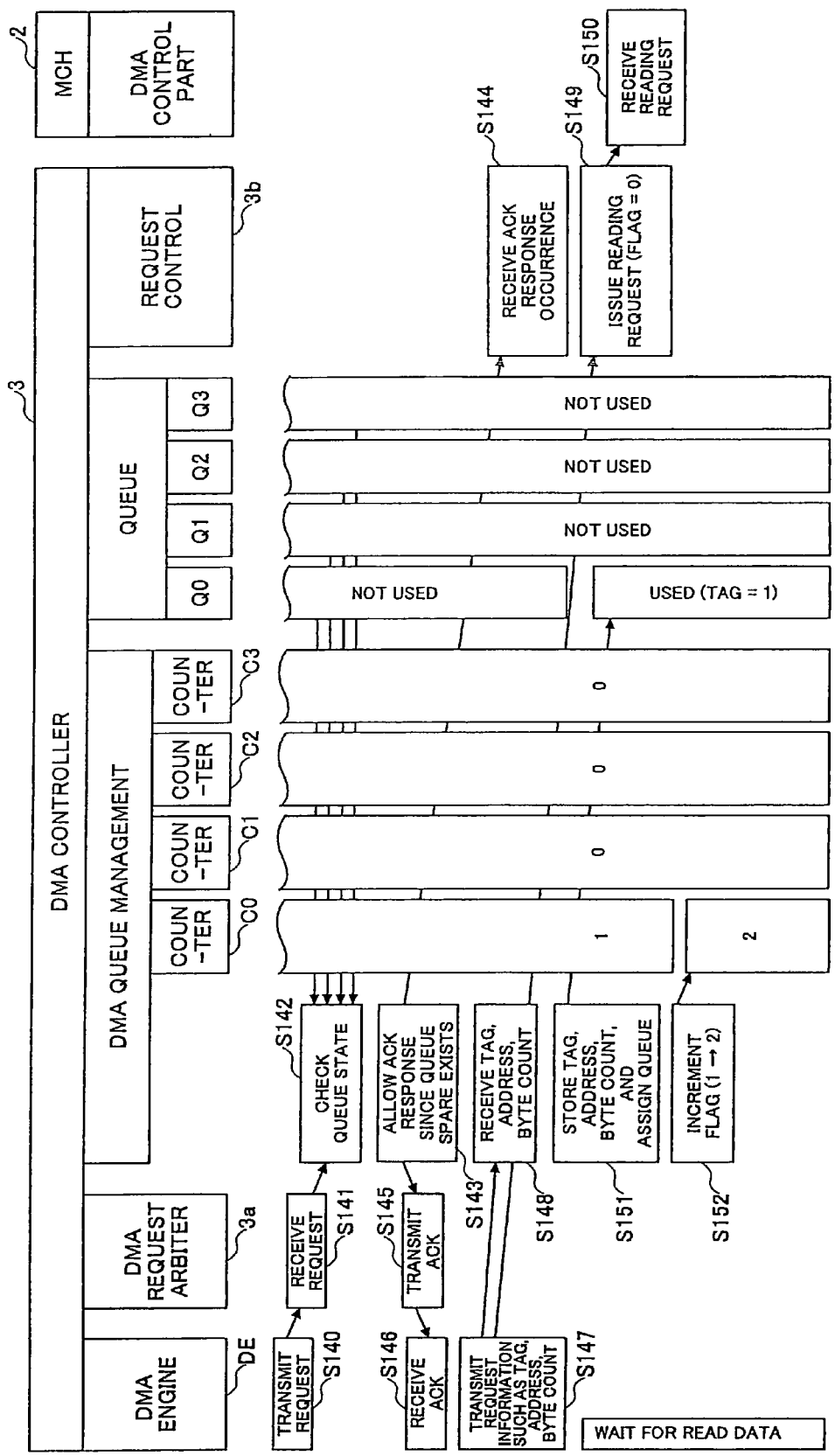

MCH 2 then reads the data from the memory 4 according to the received reading request, and then, returns the read data as a completion packet (Steps S134 of FIG. 17).

The queue management part 3c receiving it compares the information stored in the queue Q0 in use, concerning the reading request already issued, i.e., the flag, byte count and address, with the corresponding information embedded in the received completion packet (Steps S135, S136). In this case, both agree with one another, and thus, it is determined that the completion packet is proper, and the same is returned to the DMA engine, the requester (Steps S137, S138).

Figure 14:
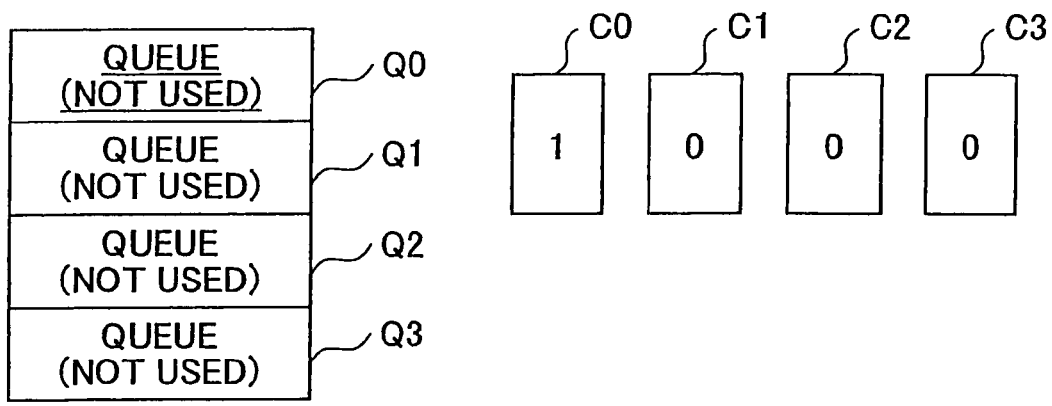
Figure 15:
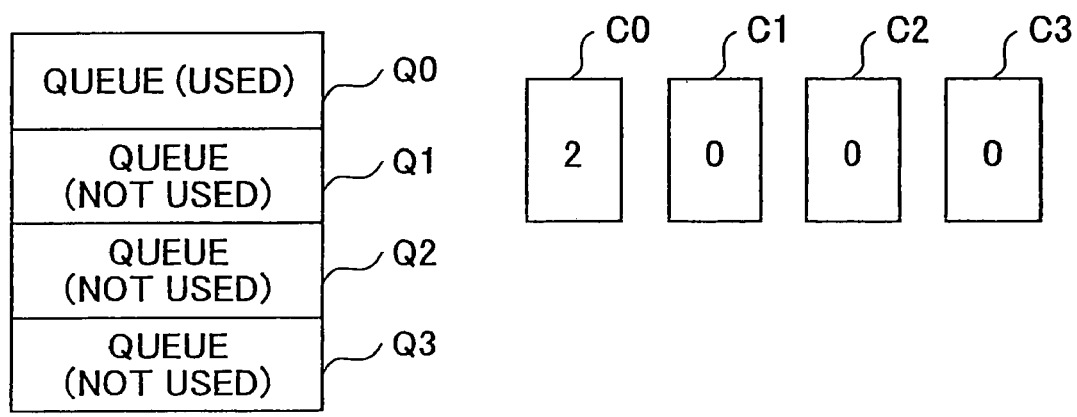

On this occasion, the assignment of the queue Q0 is then cancelled (Step S139 of FIG. 14).

When, a reading request is then newly issued by the DMA engine (Step S140 of FIG. 18), the same is received by the request control part 3b via the DMA request arbiter 3a (Step S141). Then, the queue spare state is checked (Step S142). The above-mentioned assignment cancellation results in the state that all the queues become spare, and as a result, the queue Q0 having the smallest number is again assigned (Step S151 of FIG. 15).

Operation subsequent from Step S142 (Steps S143 through S151) is the same as the operation of Steps S123 through S132 described above with reference to FIG. 16. However, since the flag counter C0 corresponding to the queue Q0 had been already incremented from 0 to 1 after the previous issuance of the reading request, the same is then further incremented from 1 to 2 after the current issuance of the reading request (Step S152).

Next, the above-mentioned 'successive request receiving occasion' operation will now be described with reference to FIGS. 19 through 27.

Figure 19:
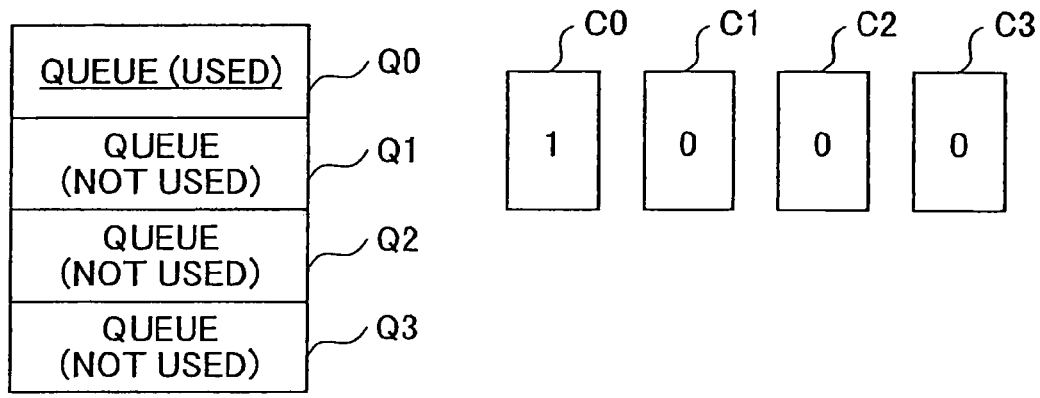
FIGS. 19 through 22 show flag assigning operation executed by the DMA controller of FIG. 5 when data reading requests are received successively.
Figure 20:
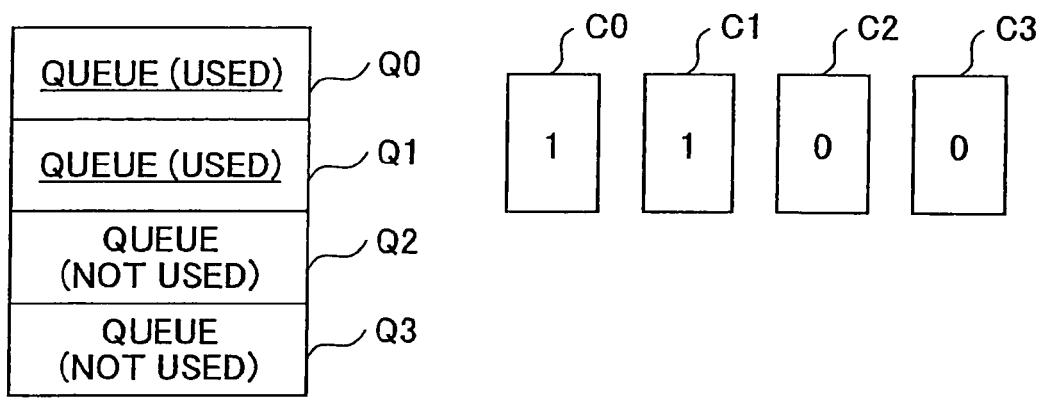

Operation carried out when the DMA engine issues a reading request first (Steps S161 through S180 of FIGS. 23 through 24) is the same as the above-described operation (Steps S121 through S133) with reference to FIG. 16. As a result of the operation, as shown in FIG. 19, the queue Q0 becomes in a used state, and the corresponding flag counter C0 is incremented into 1.

Here, it is assumed that another reading request is issued by the DMA engine before a completion packet is returned responsive to the initial reading request.

Also in this case, operation the same as that described above for the initial reading request issuance (Steps S181 through S200 of FIGS. 24 through 25) is carried out. However, in this case, the queue Q0 is already in the used state (FIG. 19), and thus, the queue having the smallest number from among the remaining spare ones, i.e., the queue Q1 is assigned (Step S192). Then, after this second reading request issuance, the corresponding flag counter C1 is incremented into 1 (FIG. 20) (Step S200). In this case, the value of the flag counter C1 corresponding to the currently assigned queue Q1 had not been incremented and was '0' when the corresponding reading request was issued (Step S190), and thus, this value '0' is embedded in this reading request.

It is noted that, the same operation is carried out also when respective reading requests are issued by a plurality of DMA engines almost at the same time.

It is assumed that, further another reading request is then issued before respective completion packets are returned responsive to these first and second reading requests.

Figure 25:
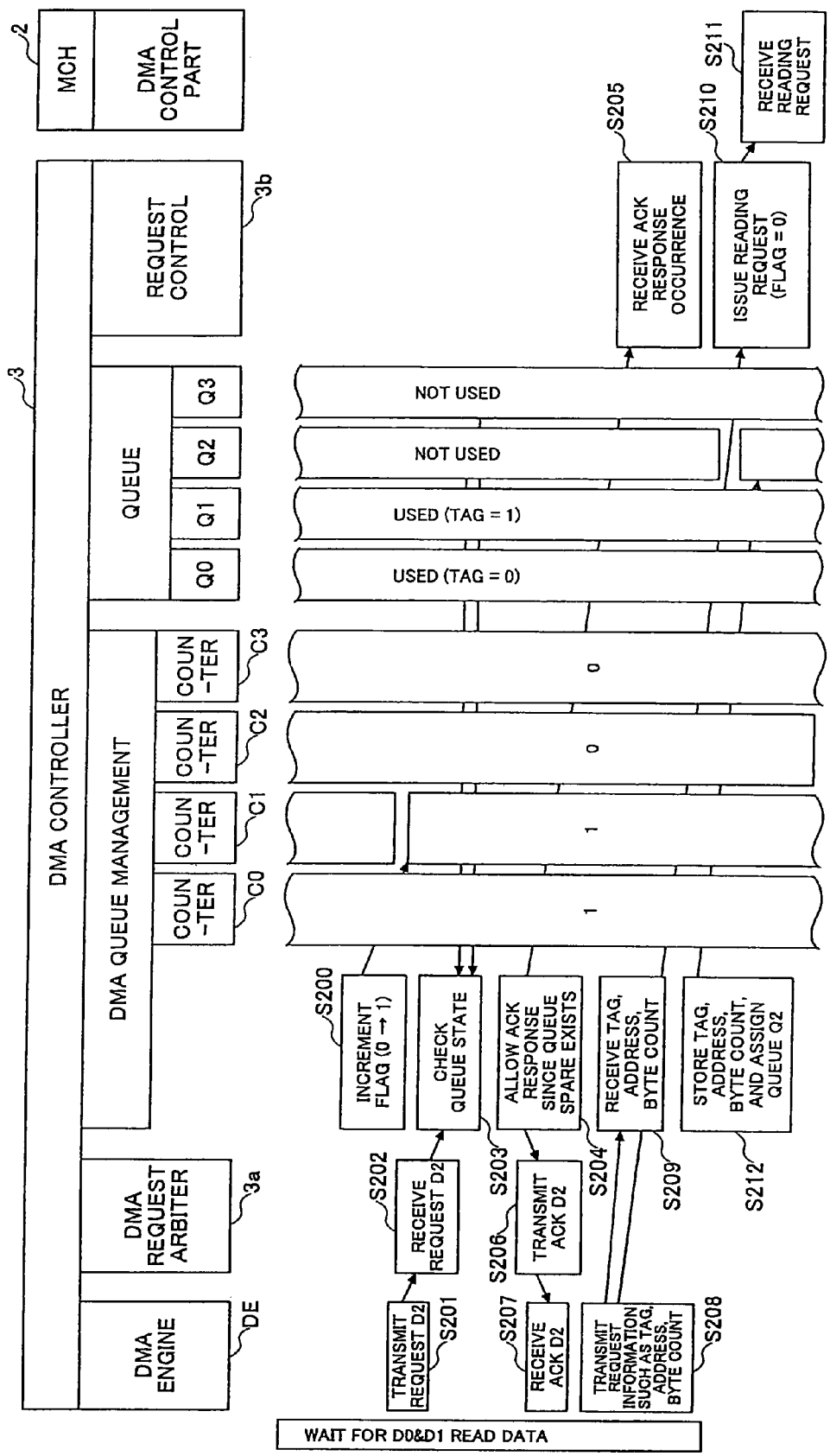
Figure 26:
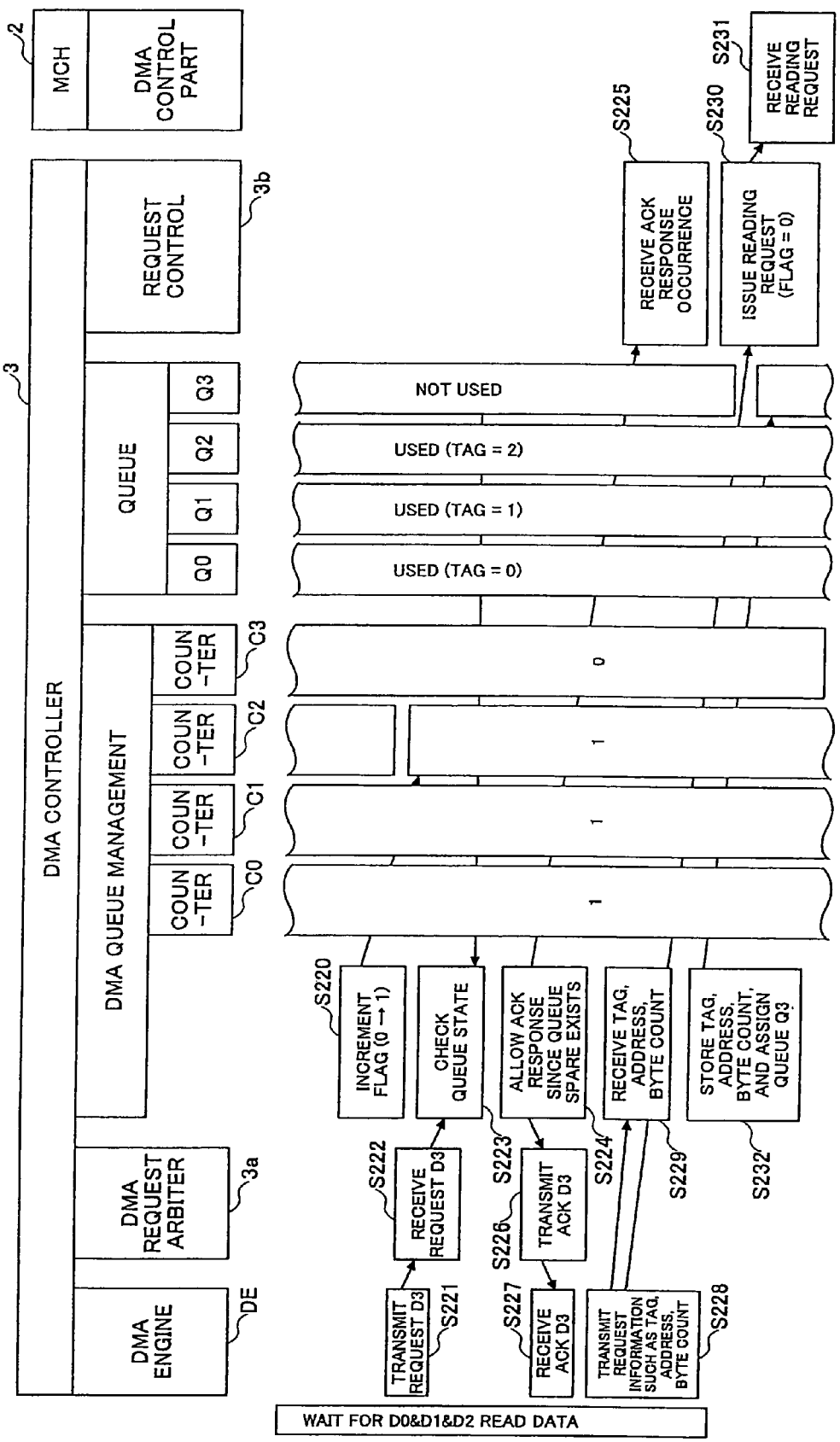

Also in this case, operation the same as that described above for the initial reading request issuance is carried out (Steps S201 through S220 of FIGS. 25 through 26). However, in this case, the queues Q0 and Q1 are already in the used states (FIG. 20), and thus, the queue having the smallest number from among the remaining spare ones, i.e., the queue Q2 is assigned (Step S212). Then, after this third reading request issuance, the corresponding flag counter C2 is incremented into 1 (Step S220). In this case, the value of the flag counter C2 corresponding to the currently assigned queue Q2 had not been incremented and was '0' when the corresponding reading request was issued (Step S210), this value '0' is embedded in this reading request.

The same operation is carried out also when, further another reading request is issued from the DMA engine before respective completion packets are returned responsive to these first through third reading requests (Steps S221 through S240 of FIGS. 26 through 27).

Figure 21:
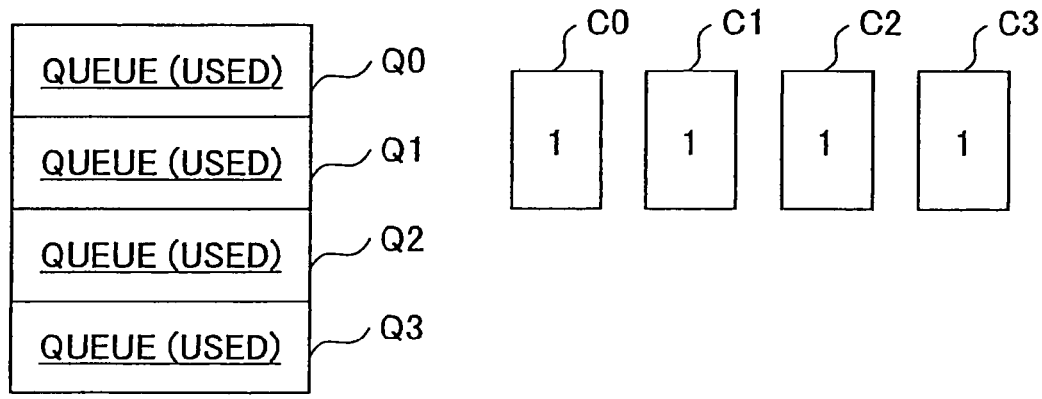

As a result, all the queues have become in the used states, and all the corresponding flag counters are incremented into 1 accordingly (FIG. 21).

It is assumed that, then, a completion packet is returned responsive to the second reading request (Step S181 of FIG. 24) first (Step S241 of FIG. 27).

Figure 22:
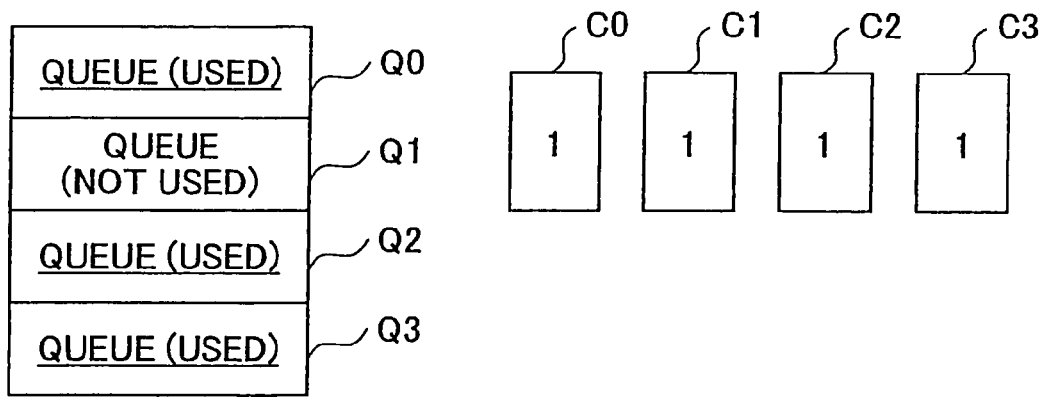
Figure 23:
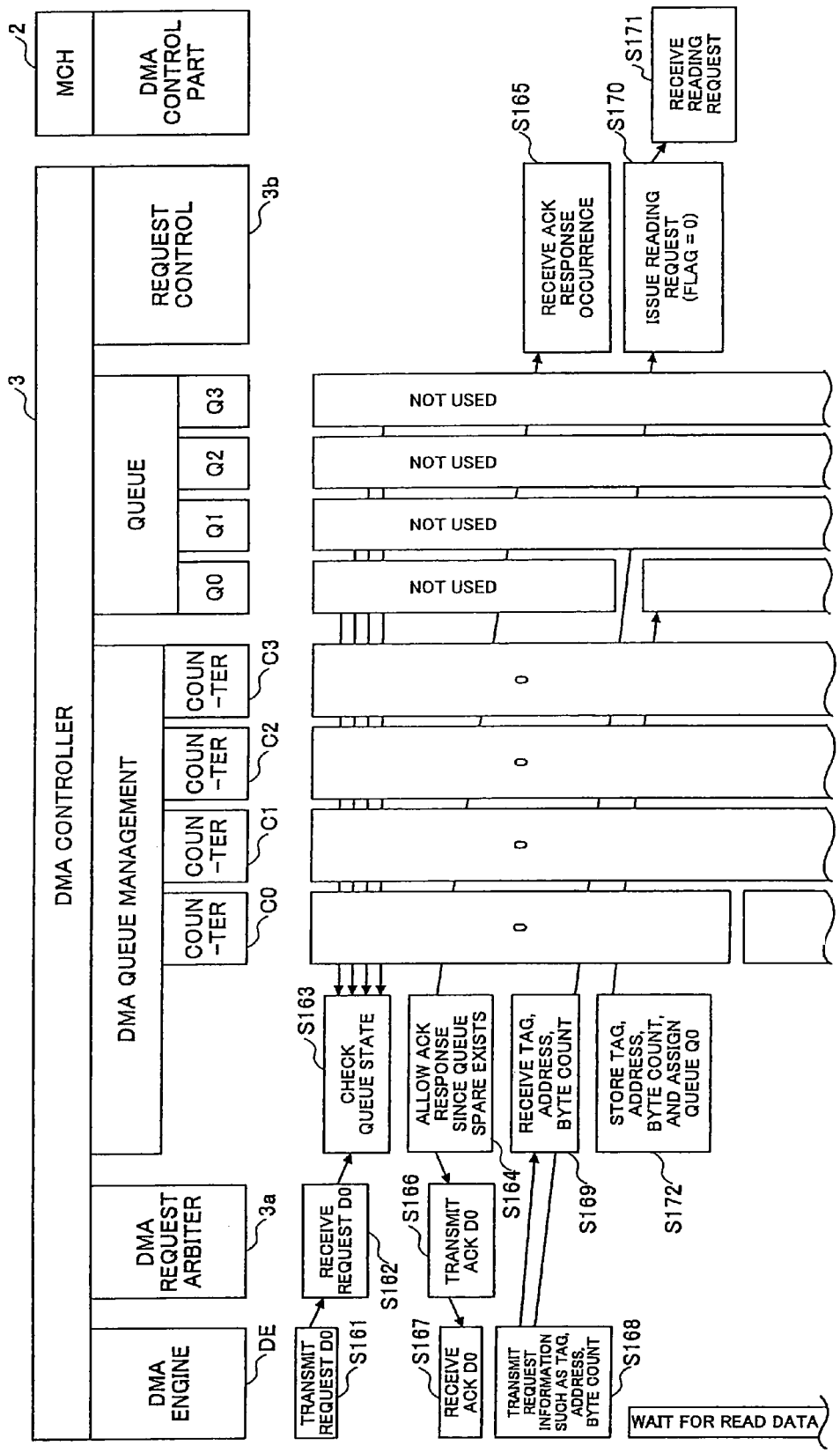
Figure 24:
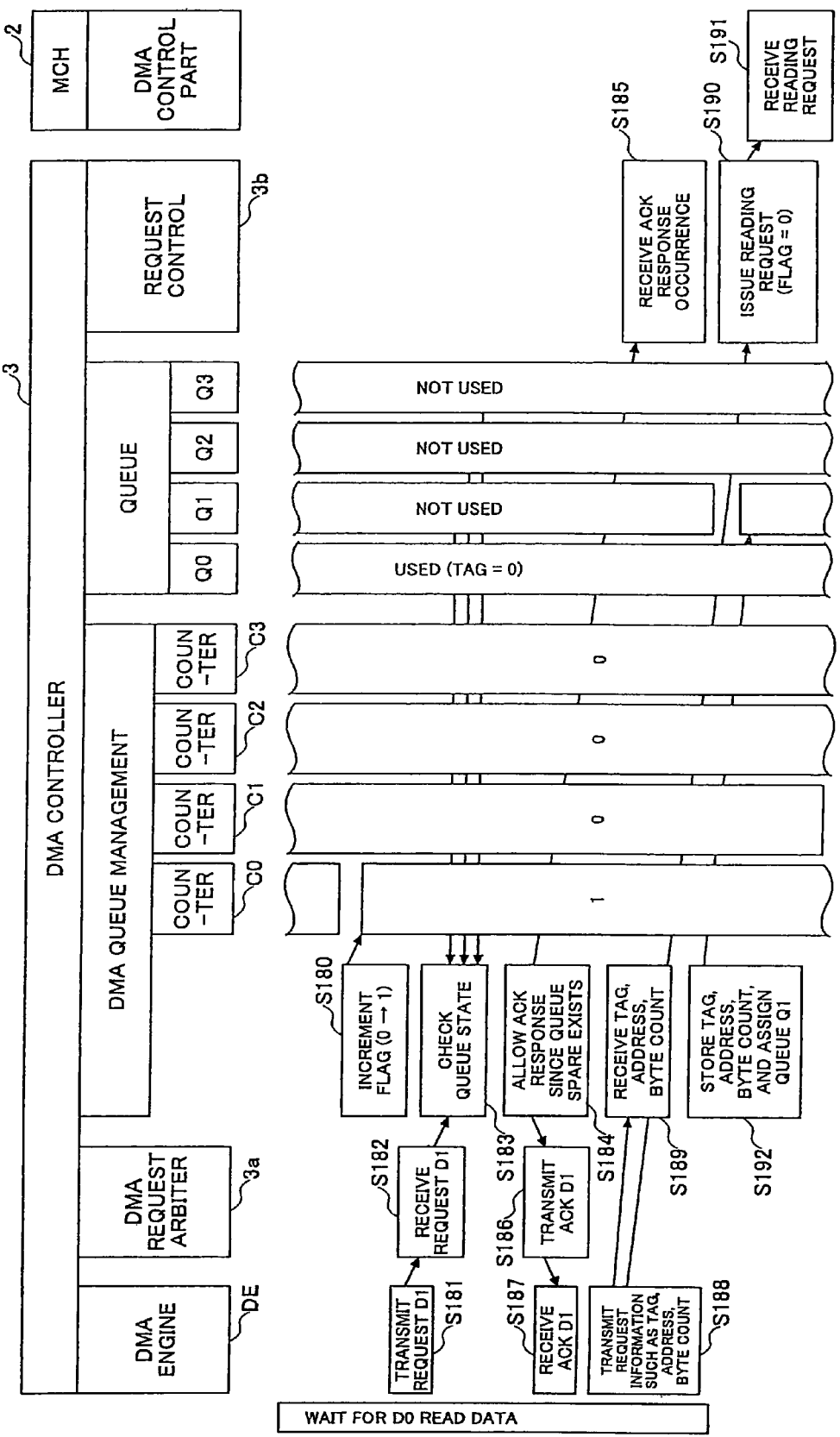

In this case, operation the same as that described above (Steps S135 through S138) is carried out (Steps S242 through S246). As a result, the assignment of the corresponding queue C1 is then cancelled (Step S246), and, as shown in FIG. 22, the queue Q1 for which the assignment is thus cancelled becomes in the not used state (spare), so that new assignment is allowed for when a further reading request is issued by the DMA engine.

It is noted that the flag counter is incremented each time when the corresponding queue is assigned and the corresponding reading request is issued. Further, in the queue, also the identification number of the requester, the DMA engine, is stored. Then, until the proper completion packet responsive to the reading request issued from the same DMA engine is obtained, the assigned state of the queue assigned for the DMA engine, which queue was assigned when the reading request was first issued, is maintained.

On the other hand, when time out is detected for this assigned queue in this state, the reading request is re-issued from the DMA engine each time. Then, each time of the re-issuance, the corresponding flag counter is incremented. Then, at this time, the value of the flag to be stored in the queue is also incremented correspondingly.

Then, when the completion packet having the tag of the DMA engine concerning the queue assignment embedded therein is obtained, the flag embedded therein is read. Then, the completion packet thus obtained is discarded when the embedded flag does not agree with the latest flag stored in the corresponding queue. However, the completion packet is determined as the proper one when the flag embedded therein agrees with the latest flag stored in the queue. In this case, the completion packet is returned to the requester, and also, the queue assignment is then cancelled.

Thus, identification determination for the proper completion packet is made possible, and occurrence of data reading error due to identification determination error can be positively avoided.

In the above description, the example in which the value of the flag is stored in the queue together with the other information concerning the reading request, has been described. However, this manner should not be limited to. The flag counter is incremented after the issuance of the reading request as mentioned above. Therefore, the value of the flag embedded in the completion packet currently obtained may be compared with the current value of the flag counter itself, and the completion packet may be determined as proper when the flag number of the completion packet is smaller than the current flag counter number by one. In this manner, storage of the value of the flag in the queue becomes not necessary.

In the above description, as the embodiment of the present invention, in the flow of operation in the file control system described above with reference to FIGS. 2 through 4, the scene has been discussed in which, in the central module 10-0 on the requester side which requests data from the hard disk drive D1, the DMA controller 3 reads the reading request command data from the memory 4 via MCH 2 (Steps S12 through S17), which reading request command data then functions to read data from the hard disk drive D1, as one example.

However, the present invention can be applied not only such a scene but also any other various scenes to read data responsive to a reading request. For example, the present invention may be applied, for example, in a scene in which the DMA controller 3 of the central module 10-0 from which the above-mentioned reading request requests data reads data from the memory 4 in the same central module 10-1; a scene in which the device controller DC1 reads data from the disk drive D1, and so forth.

Further, the present invention is not limited to the above-described embodiment, and variations and modifications may be made without departing from the basic concept of the present invention claimed below.

The present application is based on Japanese Priority Application No. 2006-072738, filed on Mar. 16, 2006, the entire contents of which are hereby incorporated herein by reference.

What is claimed is:

1. A data reading method comprising:
issuing a reading request for reading predetermined stored data after attaching a flag to the reading request;
re-issuing a reading request after attaching a flag to the reading request when read data responsive to the initially issued reading request has not arrived within a predetermined time period; and
determining, when receiving data, whether a flag included in the data is identical to the flag, which has been attached to the re-issued reading request, to determine whether the data is read data responsive to the re-issued reading request, wherein:
a plurality of queues are provided for allowing a plurality of data reading requests;
a flag counter is provided for determining the flag to be attached to the reading request, for each queue;
the flag counter is updated each time the data reading request is issued concerning a corresponding queue;
the issuing stores a row address and a byte count concerning the reading request in a corresponding queue;
the re-issuing stores the row address and the byte count concerning the re-issued reading request in a corresponding queue; and
the determining further determines, when receiving the data, whether a row address and a byte count included in the data are identical to the row address and the byte count, respectively, which have been stored in the corresponding queue when the reading request has been re-issued, to determine whether the data is read data responsive to the re-issued reading request.

2. The data reading method as claimed in claim 1, wherein issuance of the reading request is made for a data reading system in which an order of read data responsive to respective issued reading requests is not guaranteed.

3. The data reading method as claimed in claim 1, wherein:
the read data is in a form of a packet; and
the flag attached to the reading request is provided together with the packet in a state in which the flag is embedded in a not-yet-used area of the packet obtained responsive to the reading request.

4. The data reading method as claimed in claim 1, wherein:
the read data is provided to a requester in a direct memory access (DMA) transfer manner.

5. The data reading method as claimed in claim 1, wherein:
the read data is obtained with the use of an interface according to Peripheral Component Interconnect Express (PCI-Express).

6. A data reading apparatus comprising:
a reading request issuing part configured to issue a reading request for reading predetermined stored data after attaching a flag to the reading request;
a reading request re-issuing part configured to re-issue a reading request after attaching a flag to the reading request when read data responsive to the initially issued reading request has not arrived within a predetermined time period; and
a determination part configured to determine, when receiving data, whether a flag included in the data is identical to the flag, which has been attached to the re-issued reading request by the reading request re-issuing part, to determine whether the data is read data responsive to the re-issued reading request, wherein:

a plurality of queues are provided for allowing a plurality of data reading requests;

a flag counter is provided for determining the flag to be attached to the reading request, for each queue;

the flag counter is updated each time the data reading request is issued concerning a corresponding queue;

the reading request issuing part stores a row address and a byte count concerning the reading request in a corresponding queue;

the reading request re-issuing part stores the row address and the byte count concerning the re-issued reading request in a corresponding queue; and the determination part further determines, when receiving the data, whether a row address and a byte count included in the data are identical to the row address and the byte count, respectively, which have been stored in the corresponding queue when the reading request has been re-issued by the reading request re-issuing part, to determine whether the data is read data responsive to the re-issued reading request.

7. The data reading apparatus as claimed in claim 6, wherein issuance of the reading request is made for a data reading system in which an order of read data responsive to respective issued reading requests is not guaranteed.

8. The data reading apparatus as claimed in claim 6, wherein:

the read data is in a form of a packet; and the flag attached to the reading request is provided together with the packet in a state in which the flag is embedded in a not-yet-used area of the packet obtained responsive to the reading request.

9. The data reading apparatus as claimed in claim 6, wherein: the read data is provided to a requester in a direct memory access (DMA) transfer manner.

10. The data reading apparatus as claimed in claim 6, wherein: the read data is obtained with the use of an interface according to Peripheral Component Interconnect Express (PCI-Express).

* * * * *